United States Patent
Kanno et al.

(10) Patent No.: US 7,204,353 B2
(45) Date of Patent: *Apr. 17, 2007

(54) ROTARY DAMPER, AUTO PART HAVING ROTARY DAMPER AND ROTATIONAL MOTION ASSISTANT MECHANISM

(75) Inventors: Hidenori Kanno, Tokyo (JP); Ryota Shimura, Tokyo (JP); Masanori Itagaki, Tokyo (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/291,598

(22) Filed: Nov. 30, 2005

(65) Prior Publication Data

US 2006/0070834 A1   Apr. 6, 2006

Related U.S. Application Data

(63) Continuation of application No. 10/496,855, filed on May 27, 2004, now Pat. No. 7,066,308.

(51) Int. Cl.
  *F16D 57/00* (2006.01)
(52) U.S. Cl. .................... 188/290; 188/296
(58) Field of Classification Search ............ 188/290, 188/294, 296, 306, 307, 308, 309, 310; 16/51, 16/52, 58, 319, 82; 74/574
See application file for complete search history.

(56) References Cited

U.S. PATENT DOCUMENTS

| | | | | |
|---|---|---|---|---|
| 1,426,115 A | * | 8/1922 | Shultz | 188/288 |
| 1,521,602 A | * | 1/1925 | Derihon | 188/307 |
| 1,778,905 A | * | 10/1930 | Mitchell | 267/223 |
| 1,970,369 A | * | 8/1934 | Focht | 188/306 |
| 2,314,493 A | * | 3/1943 | Guy | 188/306 |

(Continued)

FOREIGN PATENT DOCUMENTS

JP  3-219131 A  9/1991

(Continued)

*Primary Examiner*—James McClellan
*Assistant Examiner*—Mariano Sy
(74) *Attorney, Agent, or Firm*—Peter F. Corless; Edwards Angell Palmer & Dodge LLP

(57) ABSTRACT

A rotary damper is provided which can include a valve (6) which automatically varies a flow rate of a viscous fluid passing through fluid passages (5a, 5b) in correspondence with variation in load. The valve (6) comprises a leaf spring. The flow rate-adjusting portion (6g) constituting the valve (6) is provided so as not to close the fluid passages (5a, 5b) when no load is applied and bends so that its one surface side projects when no load is applied and becomes deformed in a direction in which the fluid passage (5b) is closed when receiving pressure of the viscous fluid on its one surface side. The flow rate of the viscous fluid passing through the fluid passage (5b) is adjusted depending on a degree of deformation of the flow rate-adjusting portion (6g) corresponding to magnitude of pressure of the viscous fluid applied to one surface side of the flow rate-adjusting portion (6g). The flow rate-adjusting portion (6g), when receiving pressure of the viscous fluid on its other surface side, keeps the fluid passages (5a, 5b) open at all times.

4 Claims, 36 Drawing Sheets

U.S. PATENT DOCUMENTS

| | | |
|---|---|---|
| 4,768,630 A | 9/1988 | Aubry et al. |
| 5,392,884 A * | 2/1995 | Ojima .................. 188/293 |
| 6,121,526 A | 9/2000 | Kobori et al. |
| 6,264,264 B1 * | 7/2001 | Kato et al. .............. 296/97.12 |
| 6,443,210 B1 | 9/2002 | Welfonder |
| 6,725,984 B2 | 4/2004 | Orita |
| 7,066,308 B2 * | 6/2006 | Kanno et al. .............. 188/290 |
| 2005/0006189 A1 | 1/2005 | Kanno et al. |

FOREIGN PATENT DOCUMENTS

| | | |
|---|---|---|
| JP | 9-329173 A | 12/1997 |
| JP | 10-141412 A | 5/1998 |
| JP | 11-182608 A | 7/1999 |
| JP | 2000-2282 A | 1/2000 |
| JP | 2000-9169 A | 1/2000 |
| JP | 2000-249182 A | 9/2000 |

* cited by examiner

Fig. 4
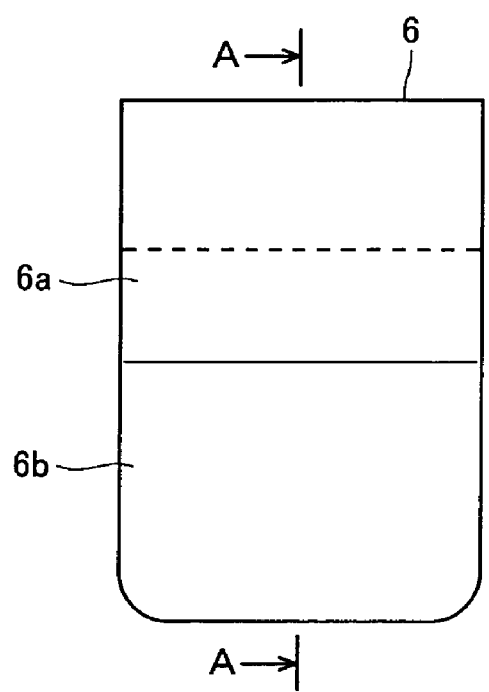
(a)
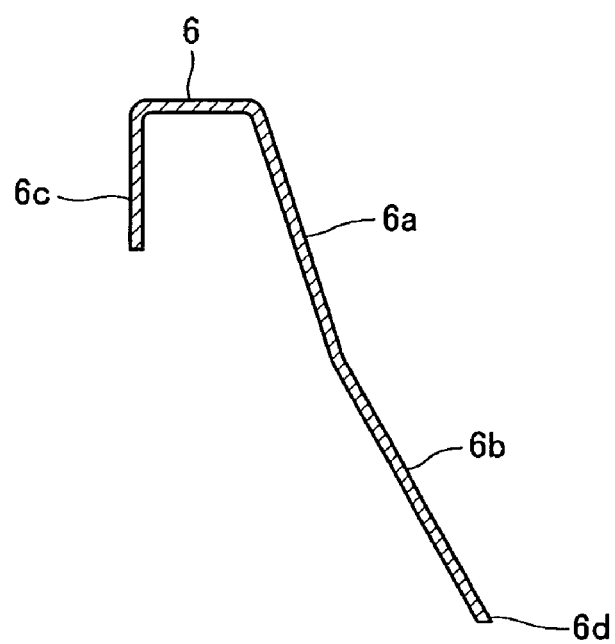
(b)

Fig. 5
(a) 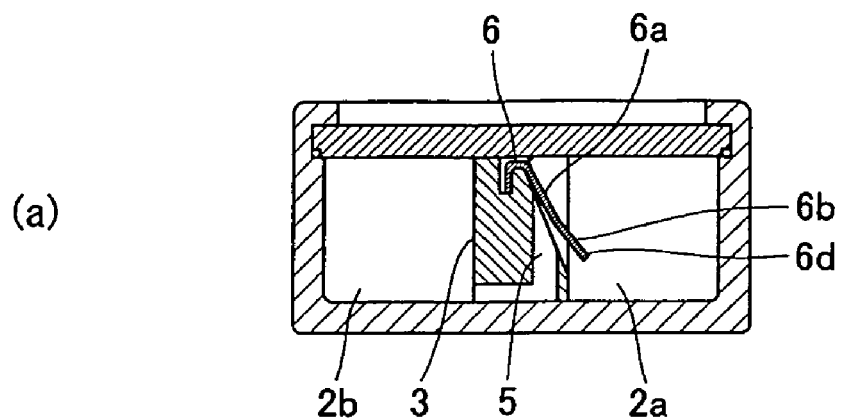
(b) 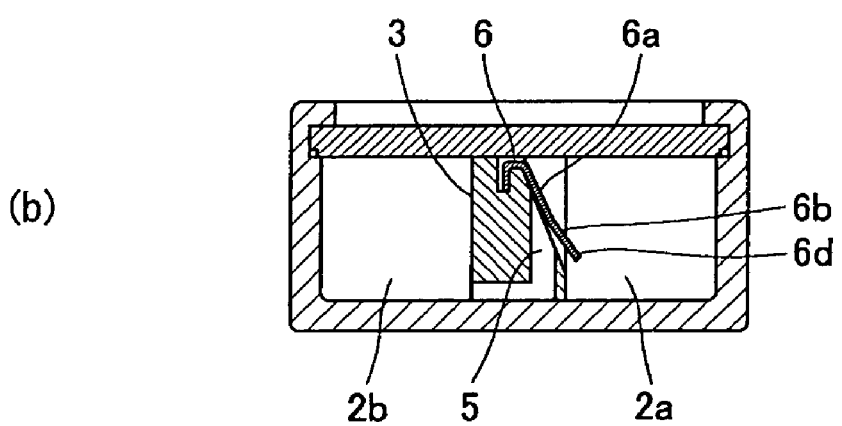
(c) 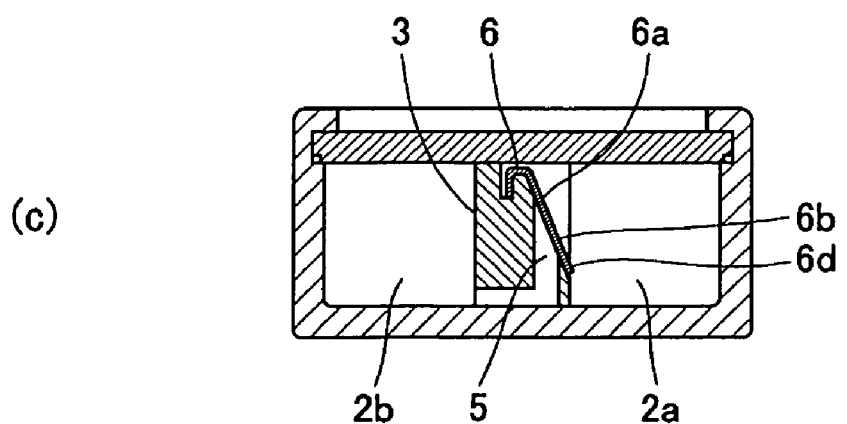

(a)                      (b)

Fig. 11
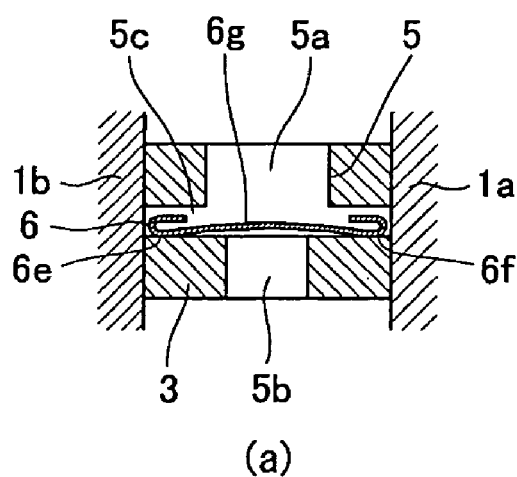
(a)
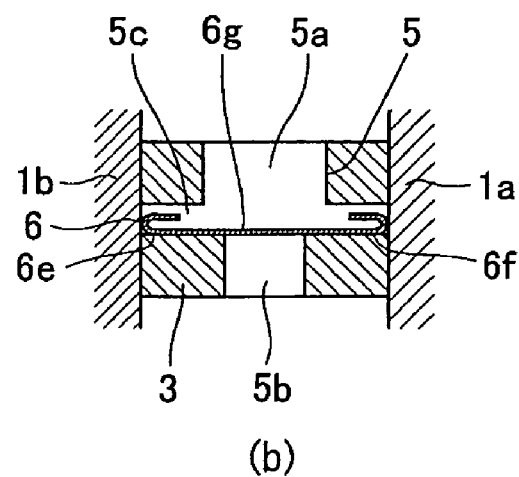
(b)

(a)

(b)

Fig. 29
(a) 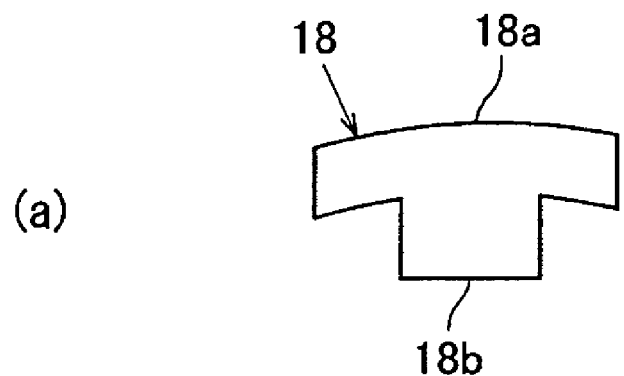
(b) 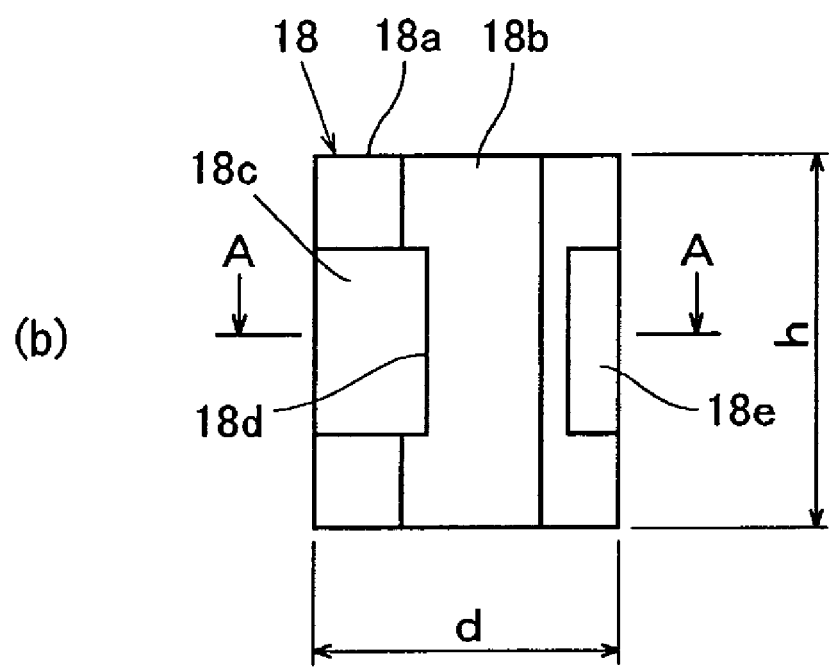
(c) 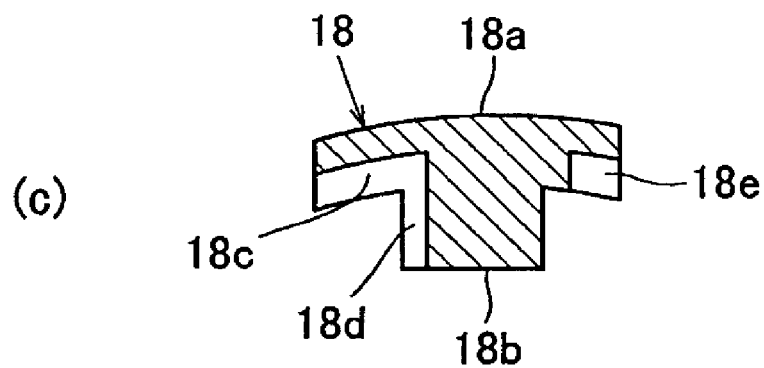

Fig. 30
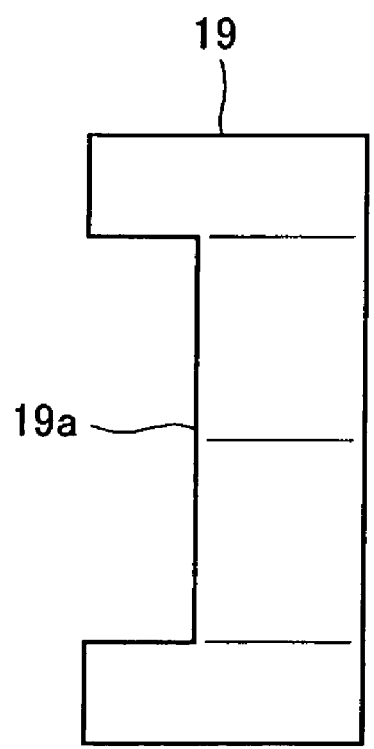
(a)
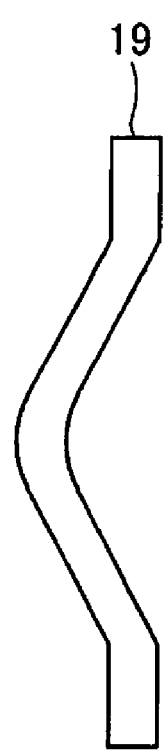
(b)

Fig. 31
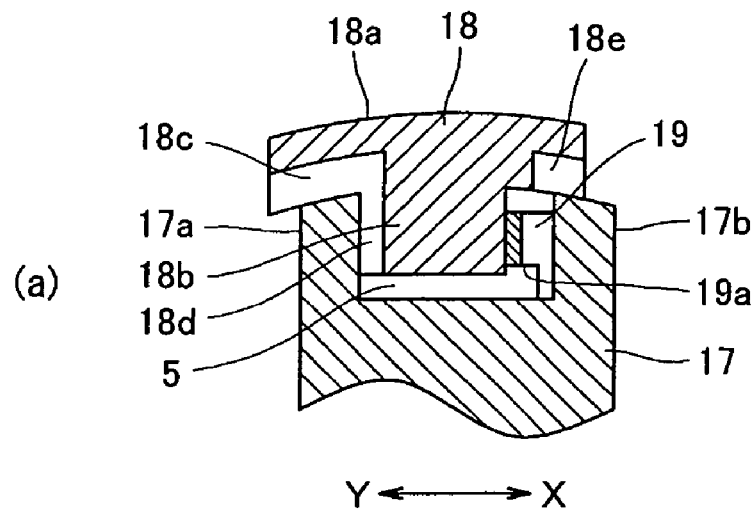
(a)
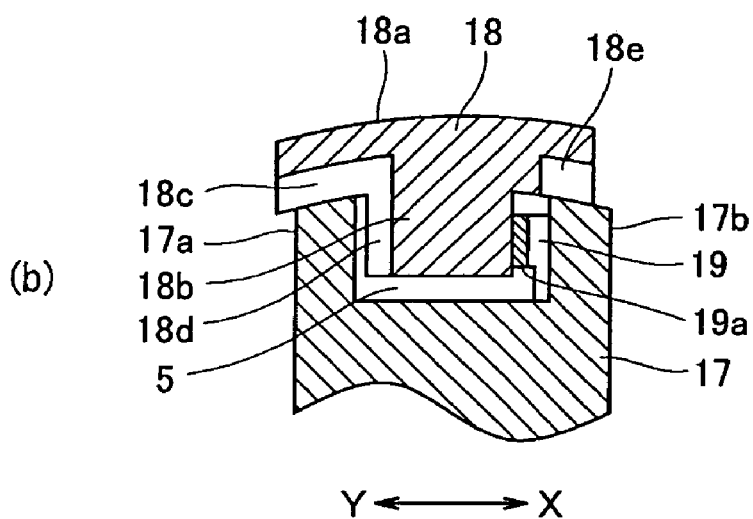
(b)
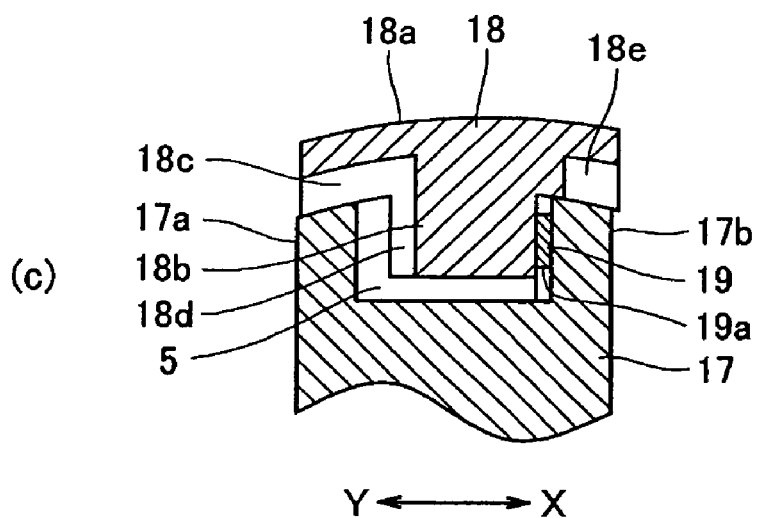
(c)

ROTARY DAMPER, AUTO PART HAVING ROTARY DAMPER AND ROTATIONAL MOTION ASSISTANT MECHANISM

The present application is a continuation of U.S. application Ser. No. 10/496,855, filed May 27, 2004 now U.S. Pat. No. 7,066,308.

TECHNICAL FIELD

The present invention relates to a rotary damper, and more particularly, to a rotary damper capable of automatically adjusting a braking force exhibited in correspondence with change in load. The invention also relates to an auto part having the rotary damper, and a rotational motion assistant mechanism.

BACKGROUND ART

Conventionally, there is a known rotary damper which gives a predetermined braking force to a subject to be controlled which is rotated, thereby moderating its rotational motion.

The rotary damper includes a vane disposed in a fluid chamber in which viscous fluid is charged. The rotary damper generates a resistance against the viscous fluid by rocking the vane. There are a one-way rotary damper in which a check valve is provided so that the braking force can be exhibited only when the vane rocks in one direction (e.g., see the following patent documents 1 and 2), and a two-way rotary damper in which no check valve is provided so that the braking force can be exhibited irrespective of the rocking direction of the vane.

In this kind of rotary damper, the vane rocks and viscous fluid is pressed, and a resistance is generated when the viscous fluid moves through a small gap between the vane and a casing, and the resistance moderates the rotational motion of the subject to be controlled.

Therefore, the magnitude of the braking force exhibited by the rotary damper can be changed by changing a size of a gap or the like through which the viscous fluid passes when the viscous fluid moves. That is, if the gap is increased in size, the resistance of the viscous fluid is reduced and thus, the braking force can be reduced. If the gap is reduced in size on the contrary, the resistance of the viscous fluid is increased and thus, the braking force can be increased.

In the conventional rotary damper, the size of the gap through which the viscous fluid passes when the viscous fluid moves is usually constant. Thus, the exhibited braking force is also constant.

In a rotary damper in which the exhibited braking force is constant, when a load is small, the braking force becomes large relatively and when the load is great, the braking force becomes small relatively. Therefore, when the load is varied, the rotation speed of the subject to be controlled is largely varied.

Therefore, if such a rotary damper is applied to the subject to be controlled which has an accommodating section for accommodating an article such as an inner lid of a console box of an automobile or a glove box disposed in an opening formed in an instrument panel of an automobile, and in which the accommodating section is turned, a rotational moment of the subject to be controlled is small when no article is accommodated, and since a load applied to the rotary damper is small, the rotational motion of the subject to be controlled becomes extremely slow. On the contrary, when an article is accommodated, the rotational moment of the subject to be controlled is great and the load applied to the rotary damper becomes great and thus, the rotational motion of the subject to be controlled adversely becomes fast.

There is also a known rotary damper in which a size of a gap or the like through which viscous fluid passes when the viscous fluid moves is changed by operating the gap from outside, and the exhibited braking force can be adjusted (e.g., see the following patent documents 3 and 4).

In such a rotary damper, however, although the braking force can be adjusted, this adjustment is carried out based on a premise that a load to be applied to the rotary damper is constant after the adjustment. Thus, even if the braking force exhibited in accordance with a subject to be controlled is adjusted at initial stage of installation of the rotary damper, if a weight of the subject to be controlled is changed thereafter and a load to be applied to the rotary damper is changed, it is, not possible to rotate the subject to be controlled at desired rotation speed unless the braking force is again adjusted.

Further, such a rotary damper must be operated from outside to adjust the braking force. Thus, if the rotational moment of the subject to be controlled is frequently changed and its changing amount is not constant like the inner lid of the console box or the glove box, this rotary damper is not suitable. That is, if the rotary damper is applied to such a subject to be controlled, whenever the rotational moment is changed as an article is loaded and unloaded, the braking force of the rotary damper must be adjusted again by predicting the changing amount of the rotational moment and operating the rotary damper from outside. Thus, it is difficult to appropriately adjust the braking force, and its operation is extremely troublesome and inconvenient.

In the conventional one-way rotary damper, a valve which realizes the one way rotary damper is formed as an independent member and then, the valve is assembled as one constituent part of the rotary damper. Thus, the number of parts is increased, a procedure for assembling the valve is necessary, and this increases the producing cost.

The rotary damper can moderate the rotational motion of the subject to be controlled by its shock absorbing effect. Therefore, when the rotary damper is applied to a reclining seat of an automobile, it is possible to moderate the forward rotational motion of a seat back against a biasing force of a spring member of a reclining mechanism which biases the seat back of the seat forward (see the following patent document 5 for example).

In the conventional rotary damper, however, the braking force can not be adjusted in accordance with the change in load. Therefore, in a reclining seat from which a head rest can be detached, the rotational moment of the seat back is changed between a case in which the head rest is attached and a case in which the head rest is detached. Thus, the rotation speed of the seat back is largely changed depending upon presence and absence of the head rest.

As other auto part, it is proposed to use the rotary damper also for an arm rest (see the following patent document 6 for example). However, in the arm rest having an accommodating section for articles, the rotational moment of the arm rest is changed depending upon a case in which the article is accommodated and a case in which no article is accommodated. Thus, in a rotary damper which can not adjust the braking force in accordance with the change in load, the rotational moment of the arm rest is changed, and its rotation speed is largely changed.

As a rotational motion assistant mechanism having a spring member which biases a subject to be controlled in one direction, there is a known mechanism which can adjust a biasing force of a spring member applied to the subject to be controlled by utilizing a fact that a stress of the spring member is changed by changing a position of a fulcrum of the spring member (see the following patent document 7 for example).

According to such a rotational motion assistant mechanism, however, since the biasing force of the spring member applied to the subject to be controlled is adjusted, a user must somehow operate the mechanism to change the position of the fulcrum of the spring member, and such an operation is troublesome and inconvenient.

The followings are conventional arts related the present invention:

Patent Document 1: Japanese Patent Application Laid-open No. H7-301272

Patent Document 2: Japanese Patent Application Laid-open No. 2002-81482

Patent Document 3: Japanese Patent Application Laid-open No. H7-197970

Patent Document 4: Japanese Patent Application Laid-open No. H7-301272

Patent Document 5: Japanese Patent Application Laid-open No. H8-38290

Patent Document 6: Japanese Patent Application Laid-open No. 2002-67767

Patent Document 7: Japanese Patent Application Laid-open No. 2001-169840

The present invention has been accomplished in view of the above-described circumstances, and it is an object of the invention to provide a rotary damper capable of automatically adjusting a braking force exhibited in correspondence with change in load. It is another object of the invention to provide an auto part in which variation in rotation speed is small even if the rotational moment is changed. It is another object of the invention to provide a rotational motion assistant mechanism capable of automatically adjusting a biasing force of a spring member applied to a subject to be controlled in correspondence with change in rotation moment of the subject to be controlled.

DISCLOSURE OF THE INVENTION

To solve the above problems, the present invention provides the following rotary damper, auto part and rotational motion assistant mechanism.

1. A rotary damper comprising a fluid chamber which is formed in a casing and into which viscous fluid is charged, a vane which is disposed in said fluid chamber, a fluid passage formed in said vane or in a partition wall which partitions said fluid chamber, and a valve which automatically varies a flow rate of the viscous fluid passing through said fluid passage in correspondence with variation in load.

2. The rotary damper according to claim 1, wherein said valve automatically varies a flow rate of the viscous fluid passing through said fluid passage in correspondence with variation in load only when said vane or said partition wall rocks in one direction.

3. The rotary damper according to claim 1, wherein said valve automatically varies a flow rate of the viscous fluid passing through said fluid passage in correspondence with variation in load irrespective of a rocking direction of said vane or said partition wall.

4. The rotary damper according to any one of claims 1 to 3, wherein said vane or said partition wall is formed with a valve hole through which the viscous fluid can pass, and said rotary damper further comprises a check valve which prevents backflow of the viscous fluid which passes through said valve hole and which allows the viscous fluid to flow only in one direction.

5. The rotary damper according to claim 4, wherein said vane or said partition wall which is formed with said fluid passage is formed with said valve hole, and said valve and said check valve comprise one leaf spring.

6. The rotary damper according to any one of claims 1 to 5, wherein said valve comprises a leaf spring including a to-be supported portion which is supported by said vane or said partition wall, and a flow rate-adjusting portion which is formed at its one surface with a pressure-receiving surface, and wherein if said pressure-receiving surface receives a pressure of the viscous fluid, said flow rate-adjusting portion is deformed to adjust the flow rate of the viscous fluid which passes through said fluid passage.

7. The rotary damper according to claim 6, wherein said flow rate-adjusting portion constituting said valve is formed at its one surface with a pressure-receiving surface comprising two or more inclined surfaces having different inclining angles.

8. The rotary damper according to claim 6, wherein said flow rate-adjusting portion constituting said valve is bent such that one surface of said flow rate-adjusting portion on which said pressure-receiving surface is formed projects.

9. The rotary damper according to any one of claims 1 to 4, wherein said valve is integrally formed on said vane or said partition wall.

10. A rotary damper comprising a rotor provided in a casing, a fluid chamber which is partitioned by a partition wall provided between said rotor and said casing and into which viscous fluid is charged, an engaging portion projecting from said rotor and disposed in said fluid chamber, a one-way valve body capable of engaging with said engaging portion with a play therebetween, a fluid passage formed between said valve body and said engaging portion, and a resilient member provided in said fluid passage for biasing said valve body in one direction, wherein said resilient member is deformed when said valve body receives a pressure of the viscous fluid and moves, and said valve body reduces a flow rate of the viscous fluid passing through said fluid passage in accordance with a deforming degree of said resilient member.

11. The rotary damper according to claim 10, wherein at least one of said engaging portion and said valve body is formed with a backflow groove which forms said fluid passage.

12. The rotary damper according to claim 10 or 11, wherein said valve body is formed into a substantially T-shape having a projection which engages with said engaging portion with a play therebetween, and an arc portion having a predetermined width, said arc portion slides with respect to an inner peripheral surface of said casing when said casing or said rotor rotates.

13. The rotary damper according to any one of claims 10 to 12, wherein said resilient member comprises a leaf spring which is, curved such that its one surface projects.

14. The rotary damper according to claim 13, wherein said resilient member includes a notch or a hole which penetrates said resilient member in its thickness direction.

15. The rotary damper according to any one of claims 1 to 14, wherein said casing includes a groove capable of supporting one end of a spring member which biases the rotation of a subject to be controlled in one direction.

16. The rotary damper according to any one of claims 1 to 15, wherein said vane or said engaging portion projects from a rotor, and said rotary damper further comprises a click mechanism which is provided in said casing and which stops rotation of said rotor at a predetermined rotation angle.
17. The rotary damper according to claim 16, wherein said click mechanism comprises a spring member provided in said casing, and a rolling member which abuts against a surface formed in said casing and having a projection when said rolling member is biased by said spring member, and said rolling member rolls along said abutment surface when said rotor rotates.
18. The rotary damper according to claim 17, wherein the projection constituting said abutment surface comprises a hard member having a predetermined height.
19. The rotary damper according to claim 18, wherein said hard member can rotate.
20. The rotary damper according to claim 2 or 10, wherein a spring member is provided in said casing, said spring member biases rotation of a rotor toward a non-braking force exhibiting direction, and said vane or said engaging portion projects from said rotor.
21. The rotary damper according to any one of claims 1 to 20, wherein said rotor from which said vane or said engaging portion projects, said rotor is hollow, and an inner shaft is provided in the hollow portion.
22. The rotary damper according to claim 21, wherein said inner shaft engages with said rotor, said inner shaft rotates together with said rotor, said inner shaft is cut at its intermediate portion, and a coil spring is disposed in the cut portion.
23. An auto part having a rotary damper according to any one of claims 1 to 22.
24. A rotational motion assistant mechanism having a spring member which biases rotation of a subject to be controlled in one direction, wherein said rotational motion assistant mechanism comprises a rotary damper according to any one of claims 1 to 22 which delays rotation of said subject to be controlled in the one direction against stress of at least said spring member.

BRIEF DESCRIPTION OF THE DRAWINGS

FIG. 4 show a valve employed in the embodiment 1, wherein (a) is a front view and (b) is a sectional view taken along A—A line in (a).
FIG. 5 are diagrams for explaining the operation of the valve employed in the embodiment 1.
FIG. 11 are diagrams for explaining the operation of the valve employed in the embodiment 2, wherein (a) and (b) are sectional views taken along A—A line in FIG. 9.
FIG. 29 show a valve body employed in the embodiment 9, wherein (a) is a plan view, (b) is a front view and (c) is a sectional view taken along A—A line in (b).
FIG. 30 show a resilient member employed in the embodiment 9, wherein (a) is a front view and (b) is a right side view.
FIG. 31 are diagram for explaining effects of a valve body and the resilient member employed in the embodiment 9.

Figure 1:
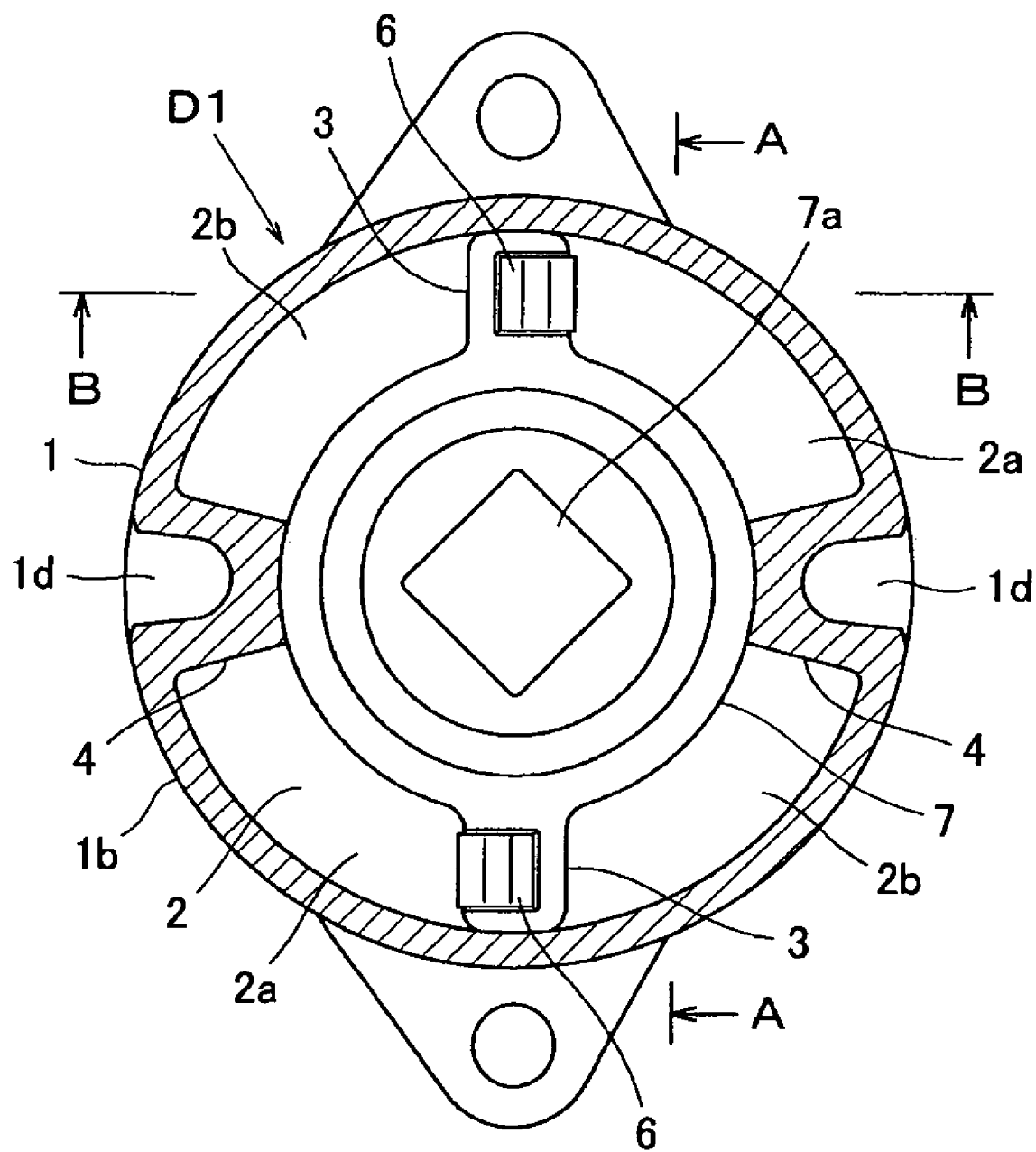
FIG. 1 shows an internal structure of a rotary damper according to an embodiment 1.

In the drawings, a symbol 1 represents a casing, a symbol 2 represents a fluid chamber, a symbol 3 represents vane, a symbol 4 represents a partition wall, a symbol 5 represents a fluid passage, a symbol 6 represents a valve and a symbol 7 represents a rotor.

BEST MODE FOR CARRYING OUT THE INVENTION

A rotary damper according to the present invention will be explained in detail based on embodiments illustrated in the drawings, but it should be noted that the scope of the invention is not limited by the embodiments.

Embodiment 1

Figure 2:
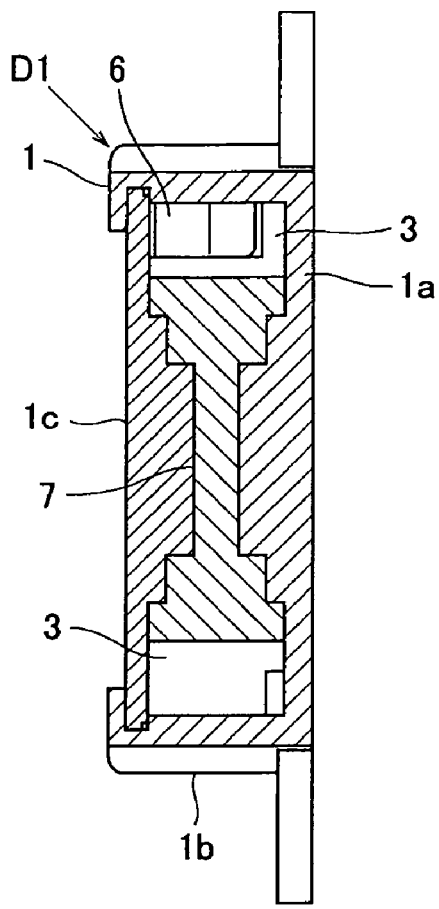
FIG. 2 is a sectional view taken along A—A line in FIG. 1.
Figure 3:
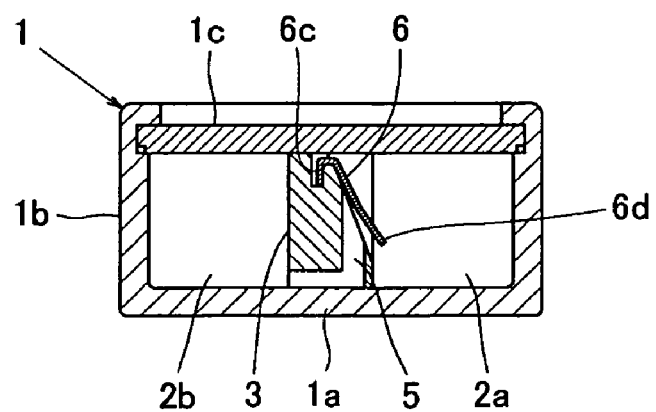
FIG. 3 is a sectional view taken along B—B line in FIG. 1.

FIGS. 1 to 3 show an internal structure of a rotary damper D1 according to the embodiment 1. As shown in FIGS. 1 to 3, a casing 1 of the rotary damper D1 comprises a cylindrical portion 1b whose one end is opened and other end is closed with a bottom wall 1a, and a closing portion 1c which closes an opening of the cylindrical portion 1b. An outer peripheral surface of the cylindrical portion 1b is formed with a groove 1d. The groove 1d can support one end of a spring member which biases a subject to be controlled in one direction. The subject to be controlled rotates. The cylindrical portion 1b is provided with a partition wall 4 which projects from an inner peripheral surface of the cylindrical portion 1b in its axial direction. A tip end surface of the partition wall 4 is curved such that an outer peripheral surface of the rotor 7 slides on the tip end surface.

The rotor 7 is provided in the casing 1. That is, the rotor 7 is provided in the casing 1 along an axis of the casing 1. With this structure, a space partitioned by the partition wall 4 is formed between the rotor 7 and the casing 1. This space serves as a fluid chamber 2. Viscous fluid such as silicon oil is charged into the fluid chamber 2.

Here, the rotor 7 includes a hollow portion 7a formed such as to penetrate the rotor 7 along its axis. A support shaft which serves as a rotation center of the subject to be controlled is inserted into the hollow portion 7a. By forming the hollow portion 7a in the rotor 7 in this manner, the rotor 7 can directly be connected to the support shaft. Therefore, the installation space of the rotary damper D1 can be reduced.

The vane 3 is integrally formed on the rotor 7 such as to project from the outer peripheral surface of the rotor 7 toward an inner peripheral surface of the cylindrical portion 1b. The vane 3 has such a length along its axial direction that when the rotor 7 rotates in the casing 1, one end surface of the vane 3 slides on the closing portion 1c and the other end surface slides on the bottom wall 1a of the cylindrical portion 1b. The vane 3 has such a radial length that the tip end surface slides on the inner peripheral surface of the cylindrical portion 1b. This vane 3 is disposed in the fluid chamber 2. With this structure, the one fluid chamber 2 is partitioned into two chambers ("first chamber 2a" and "second chamber 2b", hereinafter).

The fluid passage 5 is formed in the vane 3 along a direction substantially in parallel to the axis of the rotor 7 such that one of the openings of the fluid passage 5 is in communication with the first chamber 2a and the other opening is in communication with the second chamber 2b (see FIG. 3). If the fluid passage 5 is provided in the direction substantially in parallel to the axis of the rotor 7 in this manner, the shape of a mold for forming the rotor 7 can be simplified and thus, the producing cost of the mold can be suppressed.

The valve 6 automatically adjusts a flow rate of the viscous fluid passing through the fluid passage 5 in accordance with variation in load. That is, the valve 6 reduces the flow rate of the viscous fluid passing through the fluid passage 5 as the load is increased, and increases the flow rate of the viscous fluid as the load is reduced without operating from outside. In this embodiment, in order to achieve this function with a simple structure, the following valve 6 is employed.

That is, as shown in FIGS. 3 and 4, the valve 6 is a leaf spring comprising a to-be supported portion 6c supported by the vane 3, and a flow rate-adjusting portion 6d. A pressure-receiving surface is formed on one surface of the flow rate-adjusting portion 6d, and if the pressure-receiving surface receives a pressure of the viscous fluid, the pressure-receiving surface is deformed to adjust the flow rate of the viscous fluid passing through the fluid passage 5.

The to-be supported portion 6c is fixed to the vane 3. The flow rate-adjusting portion 6d is formed at its one surface with two inclined surfaces 6a and 6b whose inclining angles are different from each other. The to-be supported portion 6c is provided such that when no load is applied, the fluid passage 5 is not closed (see FIG. 3). In this manner, the flow rate-adjusting portion 6d is formed at its one surface with the pressure-receiving surface comprising the two inclined surfaces 6a and 6b having the different inclining angles. With this structure, the surface of the flow rate-adjusting portion 6d receiving the pressure of the viscous fluid is formed with the bent portion. Therefore, it is possible to cover a wider range of variation of the load as compared with a flow rate-adjusting portion having only one inclined surface.

The rotary damper D1 having the above-described structure functions as follows. That is, if the rotor 7 connected to the subject to be controlled through the support shaft is rotated in the counterclockwise direction in the casing 1 as the subject to be controlled is rotated in FIG. 1, the vane 3 pushes the viscous fluid in the second chamber 2b. With this, the viscous fluid in the second chamber 2b flows into the fluid passage 5. As shown in FIG. 3 and 5(a), the valve 6 located on the one of the openings of the fluid passage 5 is provided such that the flow rate-adjusting portion 6d does not close the fluid passage 5. Therefore, the viscous fluid which flowed into the fluid passage 5 from the second chamber 2b passes through the fluid passage 5 and flows into the first chamber 2a without being prevented from moving by the valve 6 almost at all. Thus, the resistance of the viscous fluid is extremely small. Therefore, the rotary damper D1 does not exhibit a braking force which affects the rotational motion of the subject to be controlled.

If the rotor 7 rotates in the clockwise direction in the casing 1 in FIG. 1 as the subject to be controlled rotates in the opposite direction on the contrary, the vane 3 pushes the viscous fluid in the first chamber 2a. With this, the pressure-receiving surfaces 6a and 6b formed on the flow rate-adjusting portion 6d of the valve 6 receive the pressure of the viscous fluid.

At that time, when the rotational moment of the subject to be controlled is small and the load applied to the rotary damper D1 is small, a force of the vane 3 pushing the viscous fluid in the first chamber 2a is small and a pressure of the viscous fluid generated by this is also small. Therefore, the flow rate-adjusting portion 6d of the valve 6 is only slightly deformed in a direction closing the fluid passage 5 as compared with a case in which the flow rate-adjusting portion 6d does not receive the pressure of the viscous fluid (see FIG. 5(a)).

On the other hand, when the rotational moment of the subject to be controlled is great and the load applied to the rotary damper D1 is great, the force of the vane 3 pushing the viscous fluid in the first chamber 2a is also great, and the pressure of the viscous fluid generated by this is also high. Therefore, the flow rate-adjusting portion 6d of the valve 6 is deformed such as to close a portion of the opening of the fluid passage 5 closer to the first chamber 2a by a portion of the flow rate-adjusting portion 6d having one (6a) of the two inclined surfaces 6a and 6b having the smaller inclining angle as shown in FIG. 5(b).

When a load equal to or greater than a predetermined value is applied to the rotary damper D1, not only the portion of the flow rate-adjusting portion 6d of the valve 6 having the inclined surface 6a but also a portion of the flow rate-adjusting portion 6d having the inclined surface 6b having the larger inclining angle are largely deformed, and the flow rate-adjusting portion 6d completely closes the fluid passage 5 as shown in FIG. 5(c).

By employing, in the rotary damper D1, the valve 6 having the flow rate-adjusting portion 6d whose deforming degree is changed in accordance with variation in load, a gap between the flow rate-adjusting portion 6d of the valve 6 and the opening of the fluid passage 5 closer to the first chamber 2a can be made small and the opening can be closed gradually as the load is increased. Therefore, it is possible to limit the flow rate of the viscous fluid moving from the first chamber 2a to the second chamber 2b through the fluid passage 5 such that the flow rate is gradually reduced.

Thus, according to the rotary damper D1, it is possible to automatically adjust the magnitude of the braking force which is exhibited in accordance with variation in load such that when the load is small, the braking force to be exhibited is small, and when the load is great, the braking force to be exhibited becomes great without operating the rotary damper from outside. As a result, according to the rotary damper D1, the variation in rotation speed can be reduced to an extremely small value even if the rotational moment of the subject to be controlled is varied.

When the flow rate-adjusting portion 6d of the valve 6 completely closes the fluid passage 5, the viscous fluid can not move from the first chamber 2a to the second chamber 2b through the fluid passage 5, and the viscous fluid can only move between the chambers 2a and 2b through a slight gap formed between the casing 1 and the vane 3. Thus, the rotary damper D1 exhibits greater braking force.

In order to confirm the characteristics of the rotary dampers D1 of the embodiment, experiments for comparing the rotary damper D1 of the embodiment with a comparative example were carried out. The rotary damper of the comparative example had a normal check valve as a valve which limited the movement of viscous fluid, i.e., a valve which prevented the viscous fluid from flowing reversely and which allowed the viscous fluid to flow only in one direction. Other structures of the rotary damper of the comparative example are the same as those of the rotary damper D1 of the embodiment.

In the experiments, a plate body whose one end was pivotally supported and other end was free was used as the subject to be controlled, and a support shaft which was a rotation center of the subject to be controlled was connected to the rotary damper D1 of the embodiment. The comparative example had the same condition. Operation time required from the instant when the free end of the subject to be controlled fell from an angle position of 60° to the instant when the free end reached an angle position of 0° was measured. The rotational motion of the subject to be controlled was changed by adding a weight having different weight to the subject to be controlled. Table 1 shows a result of the experiments, and the average operation time is shown in FIG. 6 as a graph.

TABLE 1

|  | Rotational moment (N · m) | Operation time (second) | | | | |
| --- | --- | --- | --- | --- | --- | --- |
|  |  | First time | Second time | Third time | Fourth time | Average |
| Embodiment | 0.5 | 7.22 | 7.40 | 7.25 | — | 7.29 |
| Comparative example | 0.5 | 21.15 | 22.78 | 25.81 | — | 23.25 |
| Embodiment | 1.0 | 4.75 | 4.78 | 4.78 | — | 4.77 |
| Comparative example | 1.0 | 15.18 | 15.29 | 14.66 | 14.99 | 15.03 |
| Embodiment | 1.5 | 3.44 | 3.50 | 3.03 | 3.06 | 3.26 |
| Comparative example | 1.5 | 7.72 | 7.50 | 7.46 | — | 7.56 |
| Embodiment | 2.0 | 2.34 | 2.34 | 2.25 | — | 2.31 |
| Comparative example | 2.0 | 4.29 | 4.19 | 4.19 | — | 4.22 |
| Embodiment | 2.5 | 1.78 | 1.75 | 1.79 | — | 1.77 |
| Comparative example | 2.5 | 2.44 | 2.35 | 2.38 | — | 2.39 |
| Embodiment | 3.0 | 1.25 | 1.28 | 1.31 | 1.28 | 1.28 |
| Comparative example | 3.0 | 1.28 | 1.31 | 1.31 | — | 1.30 |

Figure 6:
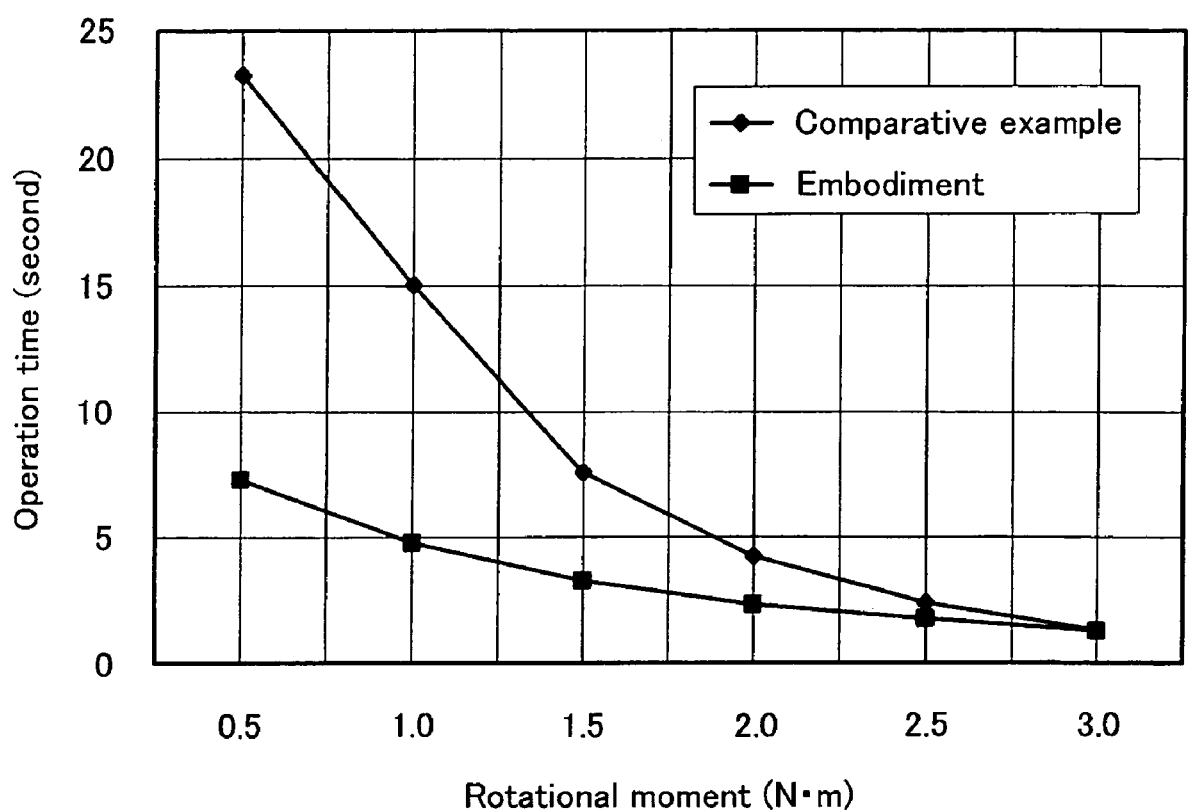
FIG. 6 is a graph showing a result of a comparison experiment between the rotary damper of the embodiment 1 and a rotary damper of a comparative example.

From the results shown in Table 1 and FIG. 6, it can be found that if the rotational moment of the subject to be controlled controlled by the rotary damper of the comparative example is changed, its operation time is also changed largely. On the other hand, in the case of the subject to be controlled controlled by the rotary damper D1 of the present embodiment, it can be found that even if the rotational moment is changed, the variation in operation time thereof is extremely small. That is, differences of the average operation time when the rotational moment is 0.5N·m and 3.0N·m are compared, the difference of the operation time of the subject to be controlled controlled by the rotary damper D1 of the present embodiment is 6.01 seconds and the variation is small, but the difference of the operation time of the subject to be controlled controlled by the rotary damper of the comparative example is 21.95 seconds and the variation is extremely large. Further, differences of the average operation time when the rotational moment is 1.0N·m and 3.0N·m are compared with each other, the difference of the operation time of the subject to be controlled controlled by the rotary damper D1 of the present embodiment is only 3.49 seconds and the variation is extremely small, but the difference of the operation time of the subject to be controlled controlled by the rotary damper of the comparative example is 13.73 seconds and the variation is large. From the results, it was confirmed that according to the rotary damper D1 of the present embodiment, even if the rotational moment of the subject to be controlled was changed, the braking force, exhibited in correspondence with the variation in load was automatically adjusted, and the variation of the rotation speed of the subject to be controlled could be reduced to an extremely small value.

Embodiment 2

Figure 7:
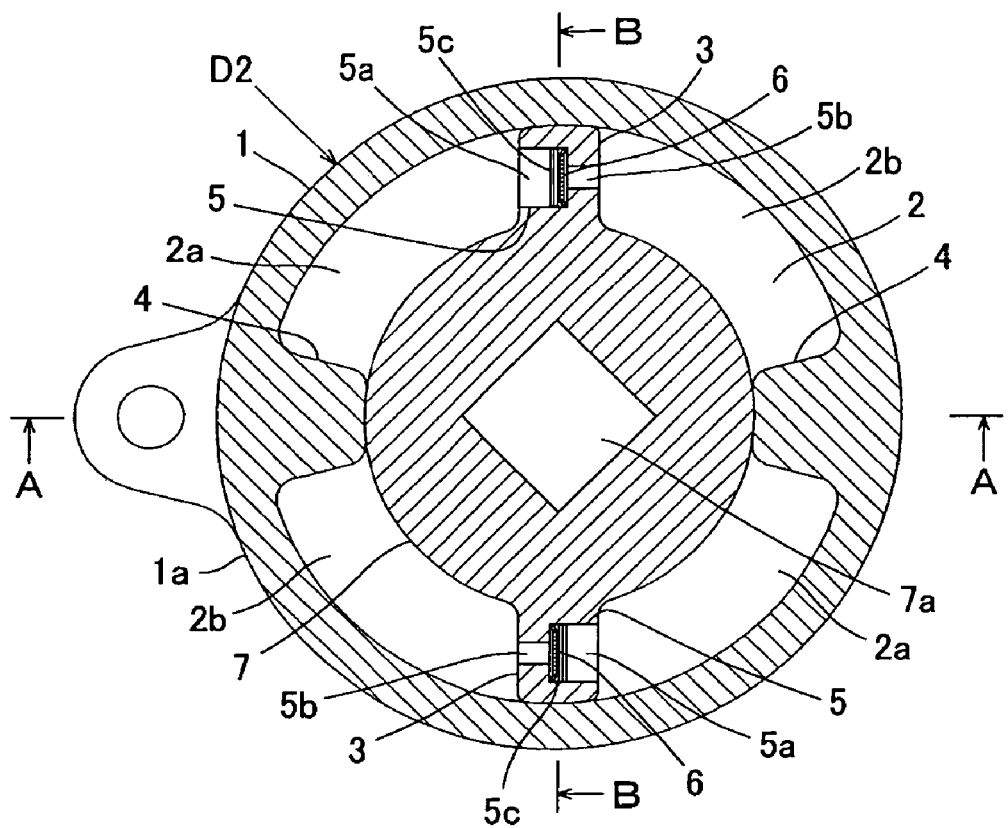
FIG. 7 shows an internal structure of a rotary damper according to an embodiment 2.
Figure 8:
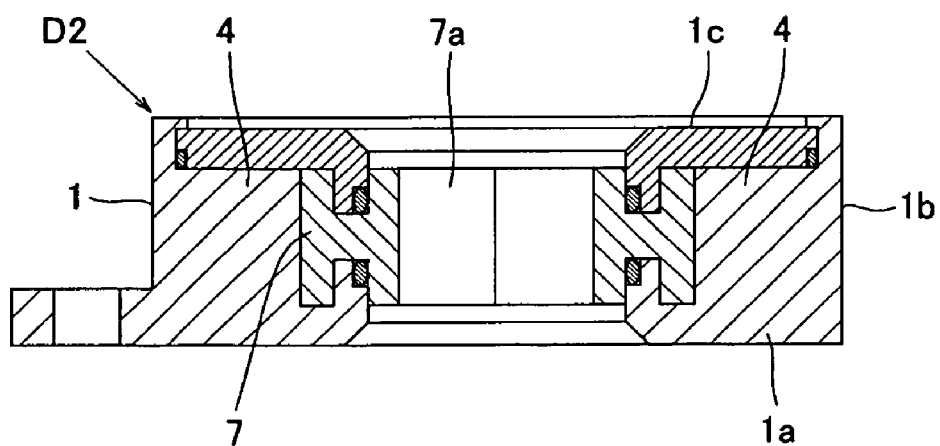
FIG. 8 is a sectional view taken along A—A line in FIG. 7.
Figure 9:
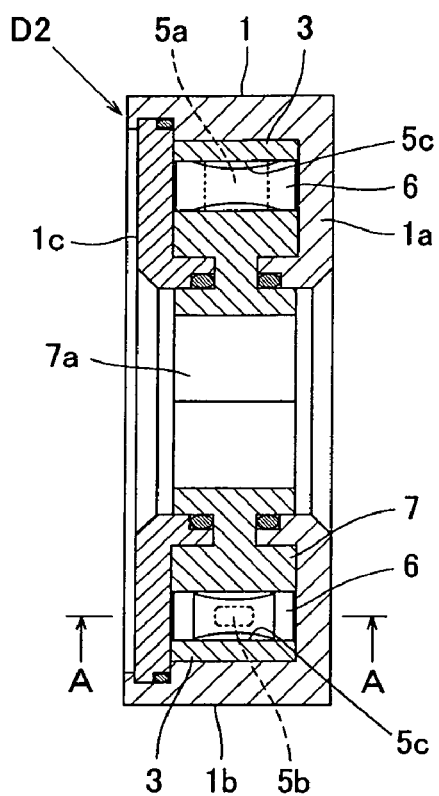
FIG. 9 is a sectional view taken along B—B line in FIG. 7.
Figure 10:
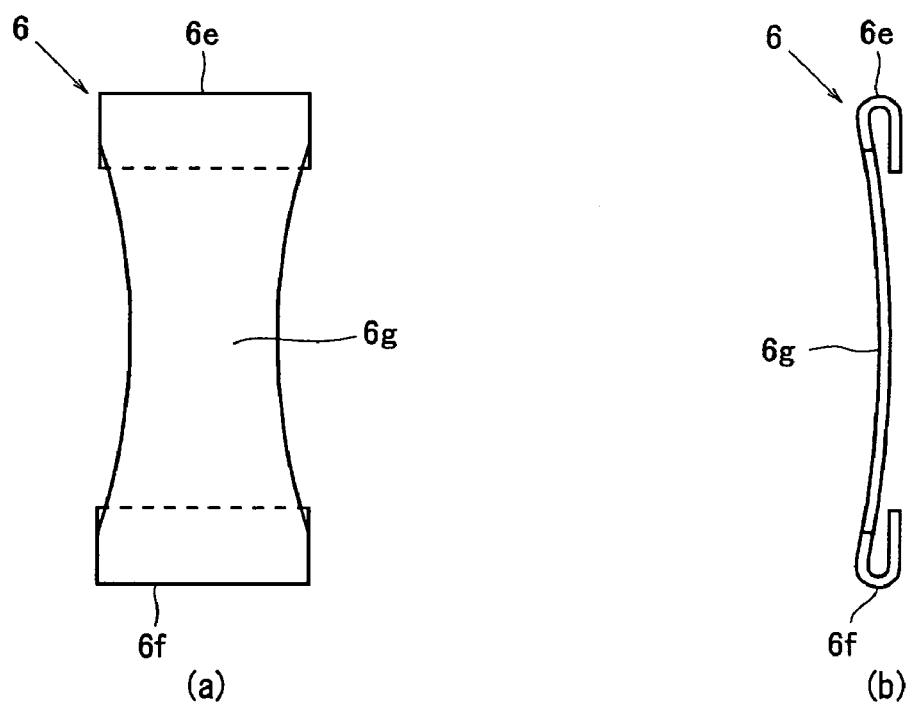
FIG. 10 show a valve employed in the embodiment 2, wherein (a) is a front view and (b) is a right side view.

In a rotary damper D2 of this embodiment, as shown in FIGS. 7, 9 and 11, the fluid passage 5 comprises large hole portions 5a which pass through the fluid, passage 5 in the thickness direction of the vane 3 and which are in communication with each other, and a small hole portion 5b which is smaller than the large hole portion 5a in diameter. As shown in FIG. 10, the valve 6 comprises a leaf spring having to-be supported portions 6e and 6f and a flow rate-adjusting portion 6g.

As shown in FIG. 10, in the valve 6, in order to secure a passage for the viscous fluid, a width of a central portion of the flow rate-adjusting portion 6g located between the to-be supported portions (opposite ends) 6e and 6f is smaller than widths of the to-be supported portions (opposite ends) 6e and 6f. The to-be supported portions (opposite ends) 6e and 6f of the valve 6 are folded back into substantially U-shape as viewed from side so that the inner surface of the casing 1 (inner surfaces of the bottom wall 1a and inner surface of the closing portion 1c) is not damaged by, the to-be supported portions (opposite ends) 6e and 6f. The flow rate-adjusting portion 6d is bent such that one surface thereof projects.

As shown in FIGS. 7, 9 and 11, the valve 6 is located on a boundary portion between the large hole portion 5a and the small hole portion 5b constituting the fluid passage 5, and is disposed in a groove 5c formed along a direction which is substantially perpendicular to the thickness direction of the vane 3.

Like the embodiment 1, this valve 6 is provided such that when no load is applied, the fluid passage 6 is not closed by the flow rate-adjusting portion 6g. That is, when no load is applied to the rotary damper D2, as shown in FIG. 11(a), the to-be supported portions (opposite ends) 6e and 6f of the valve 6 abut against the vane 3 in the groove 5c, and even when they are supported by the vane 3, the flow rate-adjusting portion 6g maintains such a shape that the flow rate-adjusting portion 6g is bent such that its one surface is bent. Therefore, a gap through which the viscous fluid can pass is formed between the flow rate-adjusting portion 6g and an opening of the small hole portion 5b closer to the large hole portion 5a which constitutes the fluid passage 5 (simply "opening of the small hole portion 5b", hereinafter).

In the rotary damper D2 having the above-described structure, if the rotor 7 is rotated in the counterclockwise direction in FIG. 7 in the casing 1, the vane 3 pushes the viscous fluid in the first chamber 2a. With this the flow rate-adjusting portion 6g of the valve 6 receives the pressure of the viscous fluid flowing into the large hole portion 5a of the fluid passage 5, and the flow rate-adjusting portion 6g is deformed in a direction closing the opening of the small hole portion 5b.

At that time, when the load applied to the rotary damper D2 is small, a force of the vane 3 pressing the viscous fluid in the first chamber 2a is also small and the pressure of the viscous fluid generated by this is also small. Therefore, the flow rate-adjusting portion 6g of the valve 6 is only deformed slightly in a direction closing the opening of the small hole portion 5b as compared with a case in which the flow rate-adjusting portion 6g does not receive the pressure of the viscous fluid (see FIG. 11(a)).

On the other hand, when the load applied to the rotary damper D2 is large, the force of the vane 3 pressing the viscous fluid in the first chamber 2a is also strong and the pressure of the viscous fluid generated by this is also great. Therefore, the flow rate-adjusting portion 6g of the valve 6 is largely deformed in the direction closing the opening of the small hole portion 5b as compared with a case in which the load is small.

When a load equal to or greater than a predetermined value is applied, the flow rate-adjusting portion 6g of the valve 6 is more largely deformed and completely closes the opening of the small hole portion 5b as shown in FIG. 11(b).

According to the rotary damper D2, like the embodiment 1, the valve 6 having the flow rate-adjusting portion 6g whose deforming degree is varied in accordance with the variation in load is employed. Therefore, as the load becomes greater, the gap between the flow rate-adjusting portion 6g of the valve 6 and the opening of the small hole portion 5b constituting the fluid passage 5 becomes smaller and the opening can be closed gradually. Thus, it is possible to limit the flow rate of the viscous fluid which moves from the first chamber 2a to the second chamber 2b through the fluid passage 5 such that the flow rate is gradually reduced.

Thus, according to the rotary damper D2, the magnitude of the braking force exhibited in accordance with the variation in load can automatically be adjusted without operating the rotary damper from outside such that when the load is small, the braking force to be exhibited is small, and when the load is great, the braking force to be exhibited becomes great. As a result, like the embodiment 1, even if the rotational moment of the subject to be controlled is varied, the variation in rotation speed can be reduced to an extremely small value.

When the flow rate-adjusting portion 6g of the valve 6 completely closes the small hole portion 5b of the fluid passage 5, the viscous fluid can not pass through the fluid passage 5, and the viscous fluid can move between the first chamber 2a and the second chamber 2b only through the small gap formed between the casing 1 and the vane 3. Thus, the rotary damper D2 exhibits greater braking force.

When the rotor 7 is rotated in the clockwise direction in FIG. 7 in the casing 1 on the contrary, the vane 3 pushes the viscous fluid in the second chamber 2b. With this, the viscous fluid in the second chamber 2b flows into the small hole portion 5b of the fluid passage 5. At that time, since the flow rate-adjusting portion 6g of the valve 6 is provided such that it does not close the opening of the small hole portion 5b as shown in FIG. 11(a), the viscous fluid which flowed into the small hole portion 5b flows into the large hole portion 5a and into the first chamber 2a without being prevented from moving by the valve 6 almost at all. Thus, the resistance of the viscous fluid is extremely small. Therefore, the rotary damper D2 does not exhibit a braking force which can affect the rotational motion of the subject to be controlled.

Embodiment 3

Figure 17:
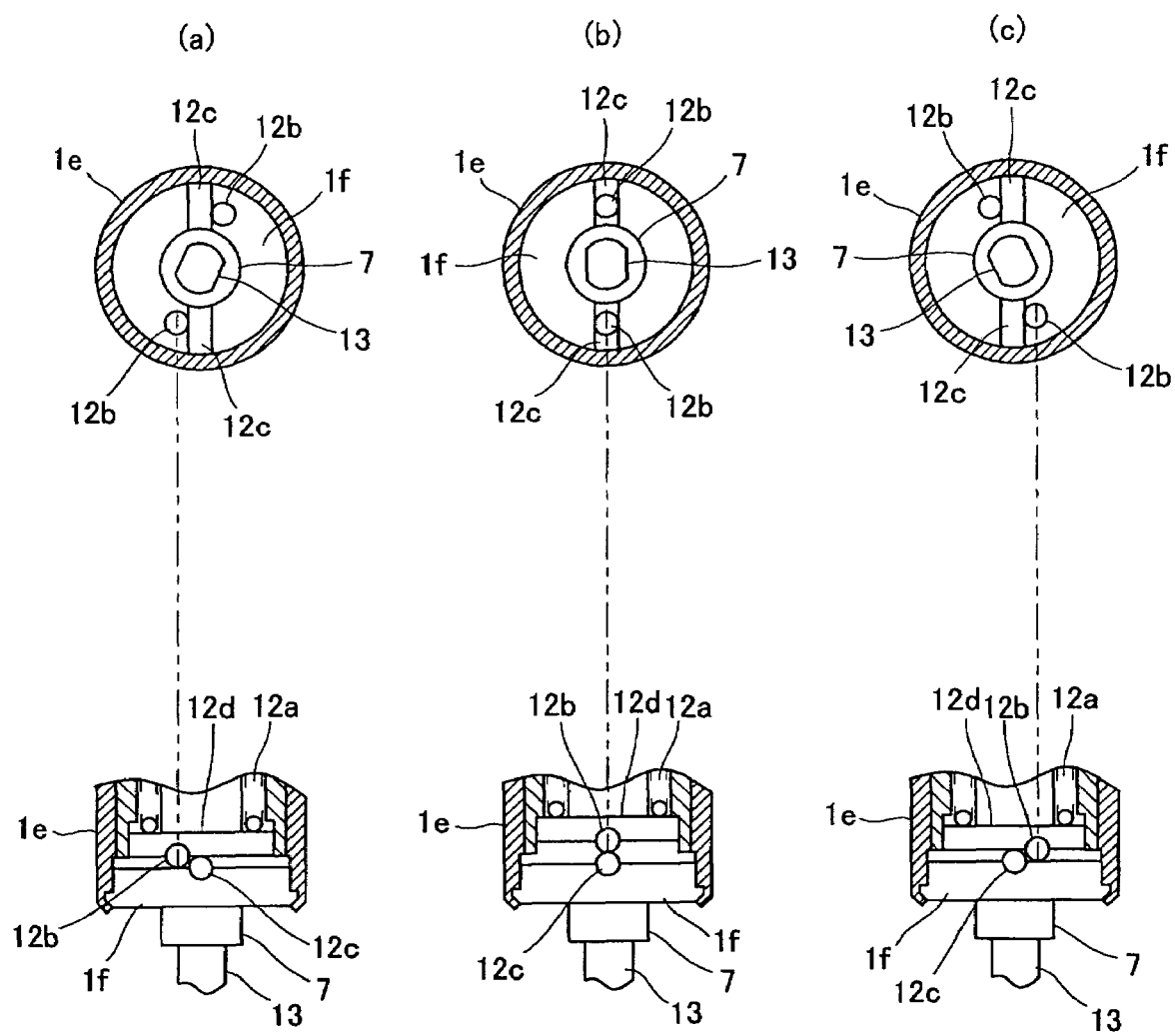
FIG. 17 are diagrams for explaining a click mechanism employed in the embodiment 3.

FIGS. 12 to 15 show an internal structure of a rotary damper D3 of this embodiment. As shown in these drawings, the casing 1 of the rotary damper D3 comprises a cylindrical portion 1e having a substantially circular cross section, and first and second closing portions 1f and 1g which close opposite ends of the cylindrical portion 1e. The first closing portion 1f which closes one end of the cylindrical portion 1e is formed at its inner surface with a recess having a substantially arc cross section. A hard member 12c which will be described later is disposed in the recess. By disposing the hard member 12c in the recess, a surface having a projection against which a later-described rolling member 12b is formed (see FIGS. 14 and 17). Instead of forming the recess in the inner surface of the first closing portion 1f, this portion may be protruded and the inner surface itself of the first closing portion 1f may be formed with the projection. The first and second closing portions 1f and 1g have shaft insertion holes 1h and 1i through which the rotor 7 is inserted. The rotor 7 functions as a rotation shaft. The first and second closing portions 1f and 1g are mounted by swaging the cylindrical portion 1e.

The opposite ends of the rotor 7 are supported by the shaft insertion holes 1h and 1i respectively formed in the first and second closing portions 1f and 1g so that the rotor 7 is provided along an axis of the casing 1. The rotor 7 is hollow, and an inner shaft 13 is disposed in the hollow portion. The inner shaft 13 has such a shape that the inner shaft 13 engages with the rotor 7 and can rotate together with the rotor 7, and the inner shaft 13 is cut at its intermediate portion, and a coil spring 14 is disposed in the cut portion. With this structure, the inner shaft 13 can expand and shrink using the resilience of the coil spring 14 and thus, the inner shaft 13 can easily be mounted on the subject to be controlled.

When the rotary damper D3 of this embodiment is applied as a double lid type opening/closing supporting mechanism comprising an outer lid and an inner lid, a base end of the outer lid is rotatably connected to the inner shaft 13, a base end of the inner lid is engaged and mounted such that the inner shaft 13 is rotated by rotating the inner lid. With this structure, the outer lid and the inner lid can opened and closed independently. When the inner shaft 13 is rotatably provided in the hollow portion of the rotor 7 unlike this embodiment, the base end of the inner lid is connected to the rotor 7, and the base end of the outer lid is connected to the inner shaft 13. With this structure, the outer lid and the inner lid can opened and closed independently.

Figure 15:
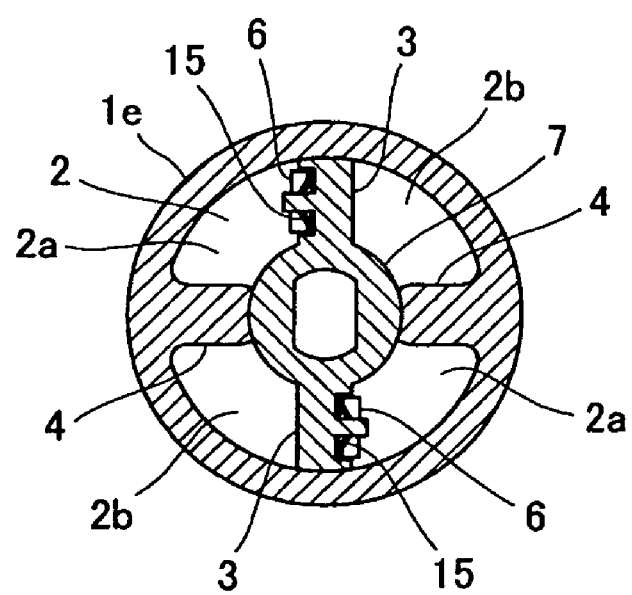
FIG. 15 is a sectional view taken along C—C line in FIG. 12.

As shown in FIG. 15, the partition walls 4 are provided such as to project from the inner peripheral surface of the cylindrical portion 1e which constitutes the casing 1 and such as to be opposed to each other. Each of tip end surfaces of the partition walls 4 has a substantially arc cross section so that the tip end surface slides on the outer peripheral surface of the rotor 7.

Figure 12:
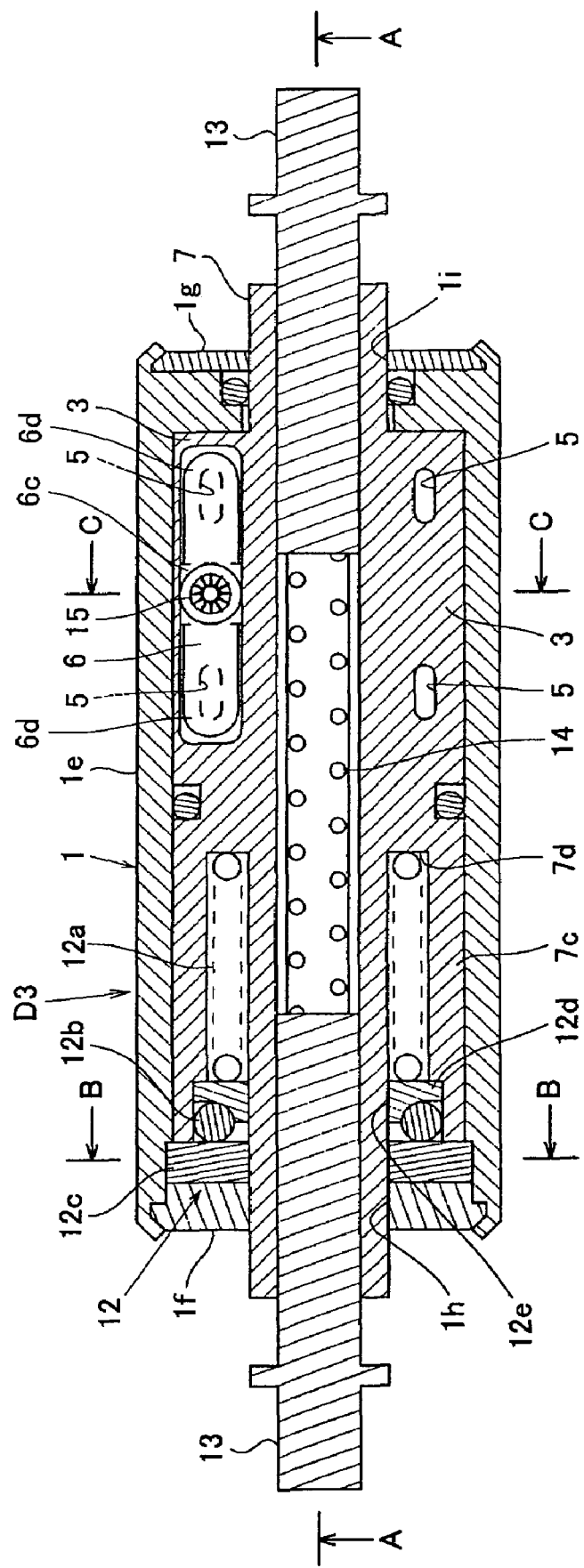
FIG. 12 shows an internal structure of a rotary damper according to an embodiment 3.
Figure 13:
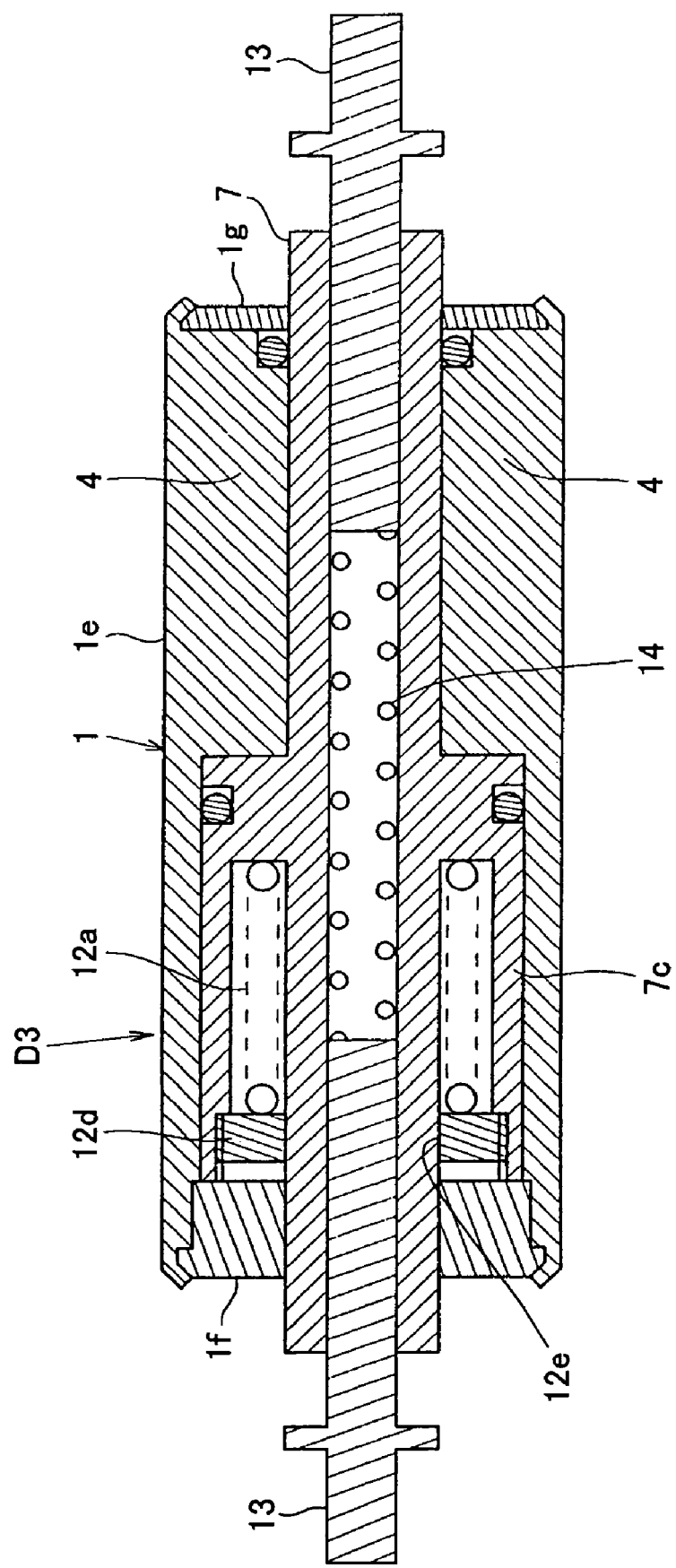
FIG. 13 is a sectional view taken along A—A line in FIG. 12.
Figure 14:
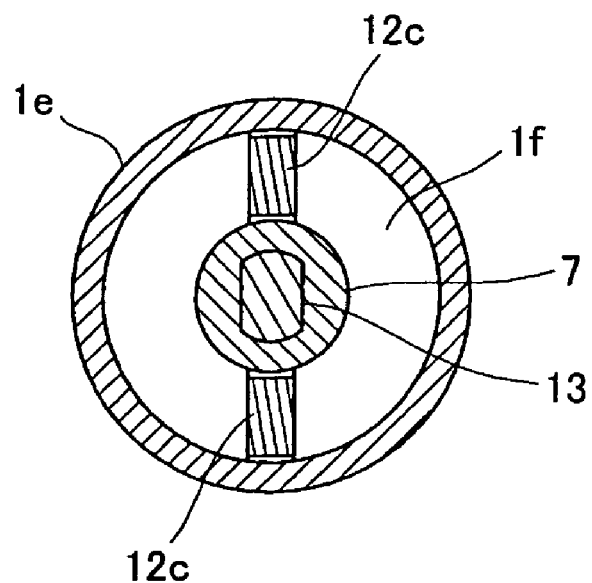
FIG. 14 is a sectional view taken along B—B line in FIG. 12.

As shown in FIG. 15, the vane 3 projects from the rotor 7 and is disposed such as to partition the fluid chamber 2 into the first chamber 2a and the second chamber 2b by means of the partition walls 4. In this embodiment, two vanes 3 are disposed such as to be opposed to each other with the rotor 7 interposed therebetween such that each of the two fluid chambers 2 formed in the casing 1 are partitioned into the first chamber 2a and the second chamber 2b by the two partition walls 4. As shown in FIG. 12, each vane 3 is formed with the fluid passage 5 which passes through the vane 3 in its thickness direction.

Viscous fluid such as silicon oil is charged into the fluid chamber 2. A seal member such as an O-ring is disposed on a predetermined position in the casing 1 to prevent the viscous fluid from leaking outside.

The valve 6 changes the flow rate of the viscous fluid moving from the first chamber 2a to the second chamber 2b through the fluid passage 5 in accordance with variation in load. That is, as the load becomes greater, the valve 6 reduces the flow rate of the viscous fluid passing through the fluid passage 5, and as the load becomes smaller, the valve 6 increases the flow rate. A structure of the valve 6 is not limited only if the valve 6 can exhibit this function. In order to achieve this function with a simple structure, the following structure is employed for the valve 6.

Figure 16:
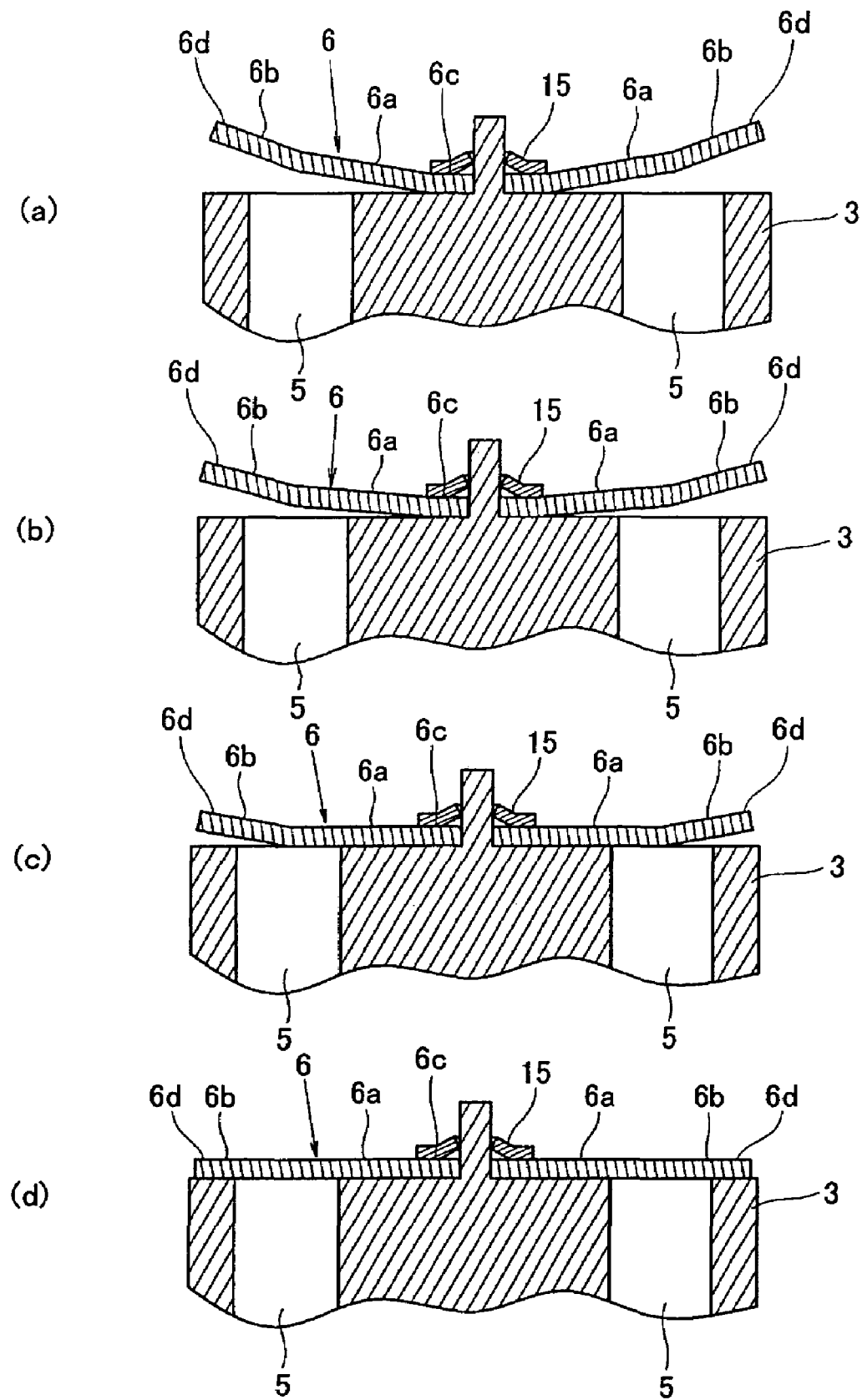
FIG. 16 show a valve employed in the embodiment 3.

That is, as shown in FIGS. 12, 15 and 16, the valve 6 comprises a leaf spring having the to-be supported portion 6c and the flow rate-adjusting portion 6d. The to-be supported portion 6c located at a substantially central portion of the valve 6 is fixed to the vane 3 using a push nut 15. The flow rate-adjusting portion 6d is formed into such a shape that it is inclined from the to-be supported portion 6c so that the flow rate-adjusting portion 6d does not close the fluid passage 5 when no load is applied.

As a preferred valve 6, as shown in FIG. 16(a), the flow rate-adjusting portion 6d is formed at its one surface with pressure-receiving surfaces comprising two or more inclined surfaces 6a and 6b having different inclining angles. With this structure, the surface of the valve 6 which receives the pressure of the viscous fluid is formed with the bent portion and thus, it is possible to cover a wider range of variation of the load as compared with a valve having only one inclined surface.

The rotary damper D3 of this embodiment further comprises a click mechanism 12. A structure of the click mechanism 12 is not limited only if the click mechanism 12 has a function for stopping the rotation of the rotor 7 at a predetermined rotation angle. For example, it is possible to employ a structure in which a pair of cam members are disposed such that their cam surfaces push against each other, one of the cam surfaces relatively slides on the other cam surface. If this structure using such cam members is employed, however, the cam member itself is expensive, the rotor 7 can not rotate smoothly due to deviated wear of the cam surface and thus, a click mechanism 12 having the following structure is employed in this embodiment.

That is, as shown in FIG. 12, the click mechanism 12 of this embodiment comprises a spring member 12a disposed in the casing 1, and a rolling member 12b. The rolling member 12b is biased by the spring member 12a and brought into abutment against a surface having a projection formed in the casing 1, and if the rotor 7 rotates, the rolling member 12b rolls along the abutment surface. In this embodiment, the projection constituting the surface (abutment surface) against which the rolling member 12b abuts comprises a hard member 12c disposed in the recess formed in the inner surface of the first closing portion 1f and having predetermined hardness.

The spring member 12a comprises a coil spring. In the casing 1, one end of the spring member 12a is integrally formed on the spring-receiving member 12d, and the other end of the spring member 12a is integrally formed with the rotor 7. The one and the other ends of the spring member 12a are supported by end walls 7d of the cylindrical portion 7c having outer diameters which are substantially equal to an inner diameter of the cylindrical portion 1e which constitutes the casing 1. The spring-receiving member 12d comprises a disk which is formed at its substantially central portion with a hole 12e into which the rotor 7 is inserted. The spring-receiving member 12d is provided in the cylindrical portion 7c such that the spring-receiving member 12d can move in the axial direction along the rotor 7 (see FIGS. 12, 13 and 17).

The rolling member 12b comprises a steel ball. The rolling member 12b is provided between the spring-receiving member 12d and the first closing portion 1f. If the rolling member 12b is biased by the spring member 12a through the spring-receiving member 12d, the rolling member 12b abuts against a surface having the projection provided in the casing 1, i.e., a surface comprising an inner surface of the first closing portion 1*f* and an outer peripheral surface of the hard member 12*c* in this embodiment. Although the steel ball is employed as the rolling member 12*b* in this embodiment, the rolling member 12*b* is not limited to this only if the rolling member 12*b* has predetermined hardness and is formed into a shape capable of rolling.

The hard members 12*c* comprise parallel pins and rotatably disposed in the recesses formed in the first closing portion 1*f*. Each the hard member 12*c* is not limited if it has the predetermined hardness and is formed into a shape capable of forming a projection on a flat surface such as the inner surface of the first closing portion 1*f*. For example, steel balls may be employed as the hard members 12*c* instead of the parallel pins. Steel balls and parallel pins subjected to thermal treatment and having predetermined hardness are commercially available, and they are less expensive than producing costs or prices of parts of the cam members. Therefore, if such commercial parts are used as the rolling member 12*b* or hard member 12*c*, the producing cost can largely be reduced.

When the hard member 12*c* is not disposed, it is necessary to form a projection of the first closing portion 1*f* itself and to carry out the thermal treatment for the first closing portion 1*f*. In this case also, it is possible to reduce the producing cost as compared with a case in which the pair of cam members constituting the mutually sliding cam surfaces must be subjected to the thermal treatment.

According to the click mechanism 12 of this embodiment, since the projection in which the deviated wear is most prone to be generated comprises the hard member 12*c*, there are merits that this portion is less prone to be worn and the first closing portion 1*f* forming the abutment surface of the rolling member 12*b* need not be subjected to the thermal treatment. Since the hard member 12*c* is rotatably provided, the hard member 12*c* rotates when the rolling member 12*b* comes into contact with the hard member 12*c*, the friction generated at that time can be reduced.

The rotary damper D3 having the above-described structure is used in the following manner. That is, when the rotary damper D3 is used as the double lid type opening/closing supporting mechanism comprising the outer lid and the inner lid, the casing 1 of the rotary damper D3 is fixed to the stationary portion, and the base end of the frame constituting the inner lid and the base end of the frame constituting the outer lid are connected to the inner shaft 13.

Here, if the inner lid can accommodate an article, the weight of the inner lid is largely changed between a case in which the inner lid sufficiently accommodates the article and a case in which the inner lid accommodates no article. When the inner lid is closed together with the outer lid, the weight of the outer lid is added to the weight of the inner lid. A load applied to the rotary damper D3 is largely changed between a case in which the inner lid accommodates no article and only the inner lid is closed, and a case in which the inner lid sufficiently accommodates the articles and the inner lid is closed together with the outer lid.

In this rotary damper D3, as the inner lid rotates in its closing direction, the rotor 7 rotates in the counterclockwise direction in FIG. 15. With this configuration, the vane 3 pushes the viscous fluid in the first chamber 2*a*. With this, the flow rate-adjusting portion 6*d* of the valve 6 receives the pressure of the viscous fluid and is deformed in the direction closing the fluid passage 5. When a load applied to the rotary damper D3 is small, for example when no article is accommodated in the inner lid and only the inner lid is to be closed, a force of the vane 3 pushing the viscous fluid in the first chamber 2*a* is weak and the pressure of the viscous fluid is also small. Therefore, as shown in FIG. 16(*b*), the flow rate-adjusting portion 6*d* of the valve 6 is only slightly deformed in a direction closing the fluid passage 5 as compared with a case in which the flow rate-adjusting portion 6*d* does not receive the pressure of the viscous fluid (see FIG. 16(*a*)).

On the other hand, when the load applied to the rotary damper D3 is large, for example, the inner lid sufficiently accommodates the articles and the inner lid is closed together with the outer lid, a force of the vane 3 pushing the viscous fluid in the first chamber 2*a* is strong and the pressure of the viscous fluid is also great. Therefore, as shown in FIG. 16(*c*), the flow rate-adjusting portion 6*d* of the valve 6 is largely deformed such as to close a portion of the opening of the fluid passage 5 close to the first chamber 2*a* by its portion having one (6*a*) of the two inclined surfaces 6*a* and 6*b* having the smaller inclining angle.

When a load equal to or greater than the predetermined value is applied, not only the portion the flow rate-adjusting portion 6*d* of the valve 6 having the inclined surface 6*a* whose inclining angle is small but also its portion having the inclined surface 6*b* whose inclining angle is greater than that of the inclined surface 6*a* is largely deformed, thereby completely closing the fluid passage 5 as shown in FIG. 16(*d*).

As described above, the rotary damper D3 employs the valve 6 having the flow rate-adjusting portion 6*d* whose deforming degree is changed in accordance with the variation in load like the embodiment 1. Thus, as the load is increased, the gap between the flow rate-adjusting portion 6*d* of the valve 6 and the opening of the fluid passage 5 is reduced, and the opening can be closed gradually. Therefore, the flow rate of the viscous fluid moving from the first chamber 2*a* to the second chamber 2*b* through the fluid passage 5 can be limited such that the flow rate is gradually reduced.

Therefore, according to the rotary damper D3, it is possible to automatically adjust the magnitude of the braking force exhibited in correspondence with the variation in load without operating the rotary damper D3 from outside such that the exhibited braking force becomes small when the load is small and the exhibited braking force when the load is great becomes great. As a result, even if the rotational moment of the inner lid as the subject to be controlled is changed, the variation of the rotation speed can be reduced to an extremely small value like the embodiment 1.

When the flow rate-adjusting portion 6*d* of the valve 6 completely closes the fluid passage 5, the viscous fluid can not pass through the fluid passage 5, and the viscous fluid can move between the first chamber 2*a* and the second chamber 2*b* only through the small gap formed between the casing 1 and the vane 3. Thus, the rotary damper D3 exhibits greater braking force.

On the other hand, when the inner lid is opened from its closed state, as the inner lid rotates in its opening direction, the rotor 7 rotates in the clockwise direction in FIG. 15 so that the vane 3 pushes the viscous fluid in the second chamber 2*b*. At that time, the flow rate-adjusting portion 6*d* of the valve 6 brings the fluid passage 5 into its fully opening state as shown in FIG. 16(*a*). Thus, a large amount of viscous fluid in the second chamber 2*b* can move into the first chamber 2*a* through the fluid passage 5, the rotary damper D3 does not exhibit the braking force, and the inner lid can smoothly be opened.

Since the rotary damper D3 includes the click mechanism 12, the inner lid can be independent in the fully opened position for example. That is, as the inner lid is opening from its fully closed position toward the fully opened position, the inner shaft 13 and the rotor 7 which engages with the inner shaft 13 rotate. With this, the rolling member 12b biased by the spring member 12a rolls along the inner surface of the first closing portion 1f as shown in FIG. 17(a).

When the inner lid reaches a position immediately before it fully opens, as shown in FIG. 17(b), the rolling member 12b runs on the top of the hard member 12c and immediately after that, i.e., when the inner lid reaches the fully opened position, as shown in FIG. 17(c), the rolling member 12b rolls down from the top of the hard member 12c along the curved surface (outer peripheral surface) of the hard member 12c, and reaches the inner surface of the first closing portion 1f. With this, the rotation of the inner shaft 13 and the rotor 7 is stopped, and the inner lid can be independent in the fully opened position. On the other hand, if an external force having a constant or higher value is applied to the inner lid in its fully opened state, the rolling member 12b rolls in the opposite direction, and the rolling member 12b runs across the hard member 12c. With this, the independent state of the inner lid is released.

According to the rotary damper D3 of this embodiment, it is possible to automatically adjust the exhibited braking force in correspondence with variation in load, and to stop the rotor 7 at a predetermined rotation angle. Further, the above effect can be obtained with the simple structure and with a single body. Thus, it is possible to exhibit the damping function and clicking function for the subject to be controlled with only the single rotary damper D3.

Embodiment 4

Figure 18:
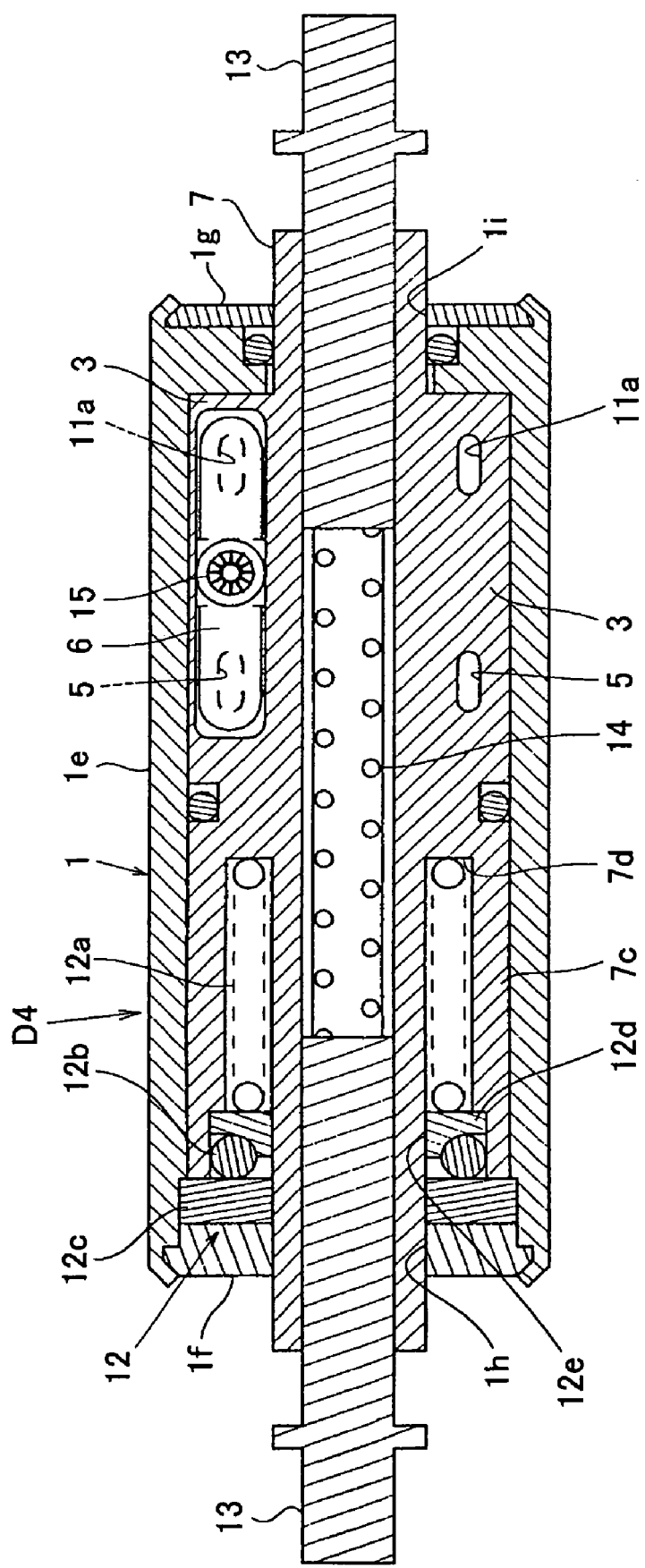
FIG. 18 shows an internal structure of a rotary damper according to an embodiment 4.
Figure 19:
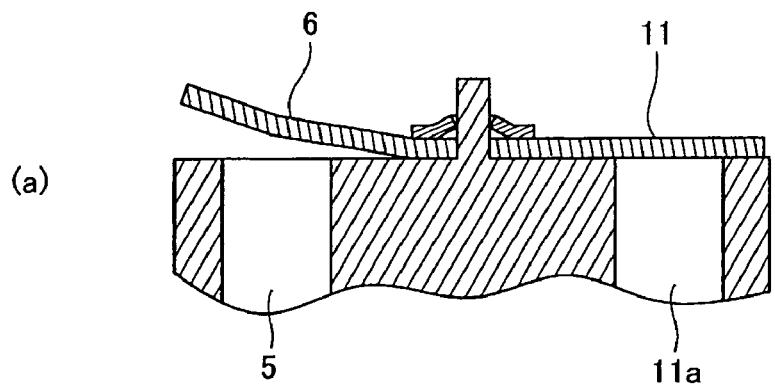
FIG. 19 are diagrams for explaining a structure and an effect of a valve and a check valve employed in the embodiment 4.

As shown in FIGS. 18 and 19, a rotary damper D4 of this embodiment is different from the rotary damper D3 of the embodiment 3 in that one of two through holes formed in the single vane 3 is used as a valve hole for the valve 6 and the other through hole is used as a valve hole for a check valve 11, and the check valve 11 is provided in addition to the valve 6.

That is, in the embodiment 3, the one vane 3 is formed with the two fluid passages 5, and both of them function as the valve holes for varying the flow rate of the viscous fluid moving from the first chamber 2a to the second chamber 2b in correspondence with variation of the load. Whereas, in the embodiment 4, as shown in FIGS. 18 and 19, one of the two through holes formed in the one vane 3 mainly functions as the valve hole (fluid passage 5) for the valve 6, and the other through hole functions as the valve hole 11a for the check valve 11.

Here, the check valve 11 may comprise a leaf spring or the like which is independent from a leaf spring constituting the valve 6, but in order to reduce the number of parts, it is preferable that the valve 6 and the check valve 11 comprise one leaf spring as shown in FIG. 19(a).

The check valve 11 is provided such that it closes the valve hole 11a when no load is applied, and only when the viscous fluid moves from the second chamber 2b to the first chamber 2a, the check valve 11 receives the pressure of the viscous fluid and is deformed as shown in FIG. 19(b), and opens the valve hole 11a. With this, when the viscous fluid moves from the second chamber 2b to the first chamber 2a, a large amount of viscous fluid can move through the two through holes, i.e., the fluid passage 5 and the valve hole 11a and thus, it is possible to reduce the resistance of the viscous fluid generated at that time to an extremely small value.

Embodiment 5

Figure 20:
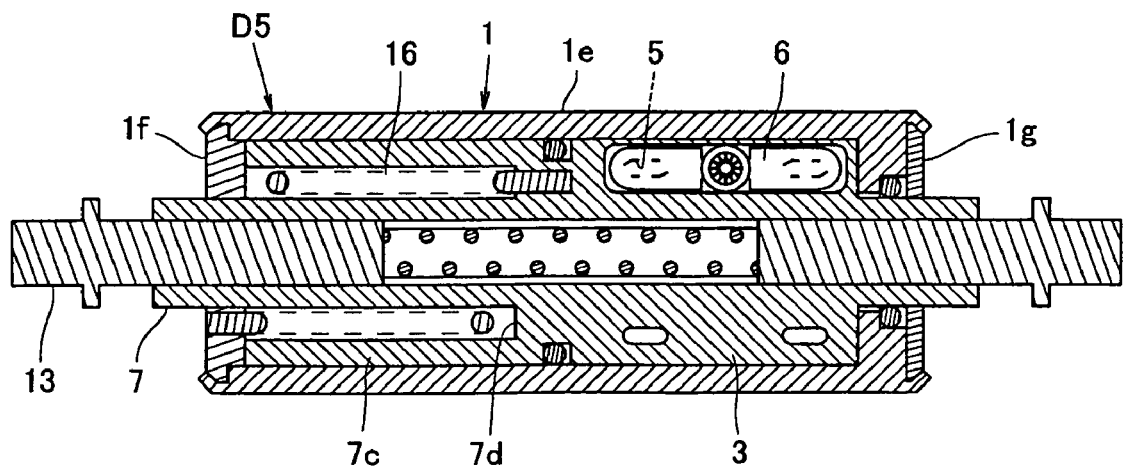
FIG. 20 shows an internal structure of a rotary damper according to an embodiment 5.

A rotary damper D5 of the embodiment 5 is different from the rotary damper D3 of the embodiment 3 in that a spring member 16 which biases the rotor 7 which rotates in the non-braking force exhibiting direction is provided in the casing 1 instead of the click mechanism as shown in FIG. 20.

The spring member 16 comprises a coil spring. One end of the spring member 16 is supported by the first closing portion 1f and the other end is supported by the end wall 7d of the cylindrical portion 7c. The cylindrical portion 7c has an outer diameter which is substantially the same as an inner diameter of the cylindrical portion 1e which constitutes the casing 1. The cylindrical portion 7c is integrally formed with the rotor 7.

The rotary damper D5 has the spring member 16. In the example of use explained in the embodiment 3, the spring member 16 is twisted, and energy accumulated in the spring member 16 is released when the inner lid is opened, and as the inner lid is opened, the rotor 7 which rotates in the non-braking force exhibiting direction is biased. Thus, the inner lid can be opened automatically or with small force.

Embodiment 6

Figure 21:
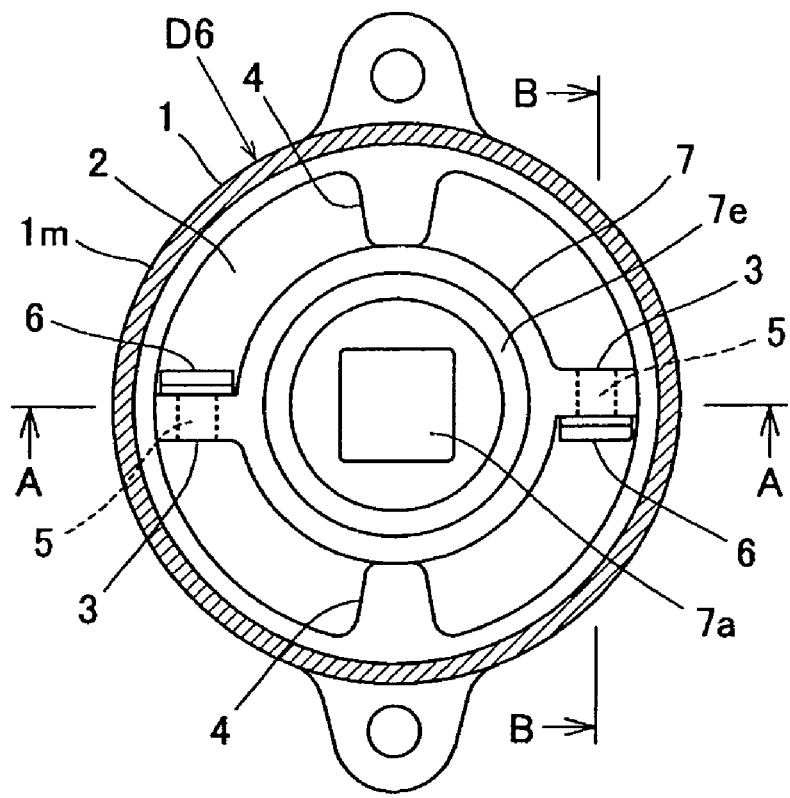
FIG. 21 shows an internal structure of a rotary damper according to an embodiment 6.
Figure 22:
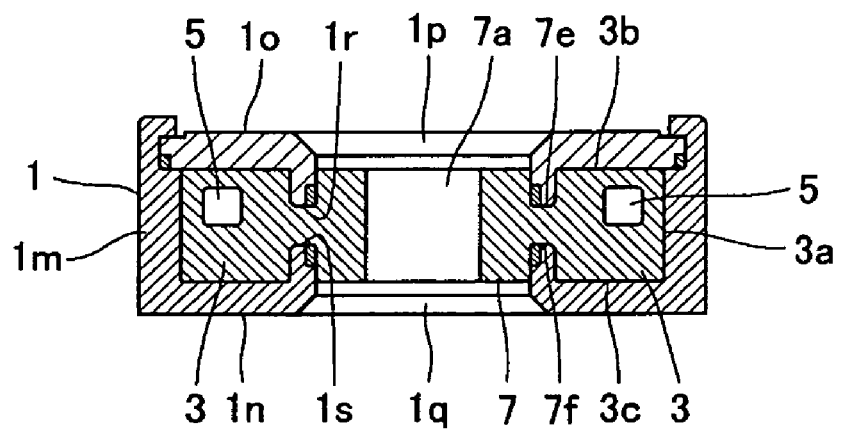
FIG. 22 is a sectional view taken along A—A line in FIG. 21.
Figure 23:
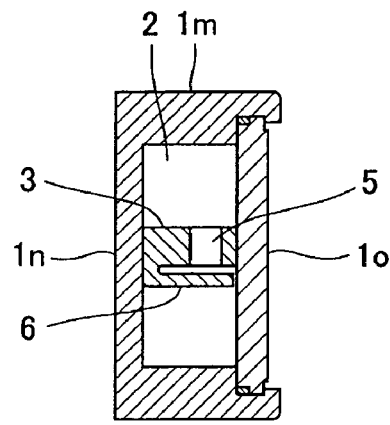
FIG. 23 is a sectional view taken along B—B line in FIG. 21.

FIGS. 21 to 23 show an internal structure of a rotary damper D6 of the embodiment 6. As shown FIGS. 21 to 23, the casing 1 of the rotary damper D6 includes a cylindrical portion 1m having a substantially circular cross section, a first closing portion 1n which is integrally formed on the cylindrical portion 1m at one end of the cylindrical portion 1m, and a second closing portion 1o mounted to the other end of the cylindrical portion 1m by swaging. Opposite ends of the cylindrical portion 1m are closed by the first and second closing portions 1n and 1o. The first and second closing portions 1n and 1o are provided at their substantially central portions with holes 1p and 1q. The holes 1p and 1q are provided at their peripheral edges with projections 1r and 1s which are fitted into grooves 7e and 7f formed in the rotor 7 to support the rotor 7.

The rotor 7 is provided at its substantially central portion with the hollow portion 7a. A shaft which rotates together with the subject to be controlled is inserted into the hollow portion 7a. The opposite end surfaces of the rotor 7 are formed with annular grooves 7e and 7f, respectively. The rotor 7 is supported such that the projections 1p and 1q of the first and second closing portions 1n and 1o are fitted into the grooves 7e and 7f, and the rotor 7 is rotatable relatively with the casing 1.

The partition walls 4 partition a space formed around the rotor 7 in the casing 1. More specifically, as shown in FIG. 21, the partition walls 4 are opposed such that they project from the inner peripheral surface of the cylindrical portion 1m which constitutes the casing 1 to the axial direction, and each tip end surface of the partition wall 4 has substantially arc cross section such that the tip end subject slides on the outer peripheral surface of the rotor 7.

By partitioning the space around the rotor 7 by the partition walls 4 as described above, the space formed in the casing 1 is the fluid chamber 2, and viscous fluid such as silicon oil is charged into the fluid chamber 2.

As shown in FIGS. 21 and 22, the vanes 3 are integrally formed on the rotor 7 such that the vanes 3 project from the outer peripheral surface of the rotor 7 toward the inner peripheral surface of the cylindrical portion 1m. In this embodiment, the vanes 3 are provided at symmetric positions with respect to the rotor 7. As shown in FIG. 22, each vane 3 is formed into a plate shape having such a size that as the rotor 7 rotates, a tip end surface 3a of the vane 3 slides on the cylindrical portion 1m, an upper end surface 3b of the vane 3 slides on the second closing portion 1o, and a lower end surface 3c of the vane 3 slides on the first closing portion 1n. Each vane 3 is formed with the fluid passage 5 which passes through the vane 3 in its thickness direction. The number of fluid passages 5 is not limited, and one vane 3 may be formed with a plurality of fluid passages 5.

Figure 24:
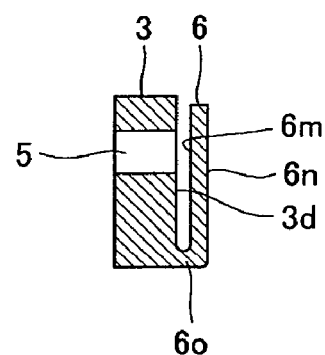
FIG. 24 shows structures of a vane and a valve employed in the embodiment 6.

As shown in FIGS. 21, 23 and 24, the valve 6 includes a surface ("opposed surface", hereinafter) 6m which is opposed to one side surface 3d of the vane 3 at a constant distance from the one side surface 3d of the vane 3 and which has an area capable of closing the fluid passage 5, and a surface ("pressure-receiving surface", hereinafter) 6n which is located on the opposite side of the opposed surface 6m and which receives the pressure of the viscous fluid as the vane 3 rocks. The valve 6 is integrally formed on the vane, 3 such that a portion of the valve 6 other than a root 6o projecting from the one side surface 3d of the vane 3 is not related to any portion of the vane 3.

If the valve 6 has such resilience that if the valve 6 receives an external force, the valve 6 is deformed, and if the external force is released, the valve 6 is returned to its original shape. The magnitude of the external force which can deform the valve 6 is varied depending upon how a material, a size and a shape of the valve 6 are set. Especially, this largely depends on a width of the root 6o of the valve 6 and a shape of the valve 6 near the root 6o. The same can be said as to how much the valve 6 is deformed if it receives the external force.

Figure 25:
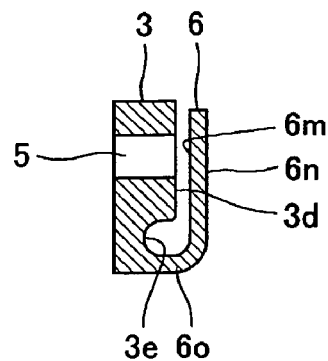
FIG. 25 shows structures of other vane and valve.

For example, as shown in FIG. 25, the root 6o of the valve 6 has substantially arc cross section and the vane 3 is formed at its portion near the root 6o with a dent 3e. With this structure, the valve 6 can be deformed such that the opposed surface 6m of the valve 6 comes into intimate contact with the one side surface 3d of the vane 3 and the fluid passage 5 is closed.

When no load is applied, since the opposed surface 6m of the valve 6 is separated from the one side surface 3d of the vane 3 at a constant distance, the fluid passage 5 is opened. On the other hand, if the predetermined or higher load is applied to the rotary damper D6, the pressure-receiving surface 6n receives the pressure of the viscous fluid generated at that time and the valve 6 is deformed, the opposed surface 6m comes into intimate contact with the one side surface 3d of the vane 3 to close the fluid passage 5. If the load applied to the rotary damper D6 is released, the valve 6 is returned to its original shape by the resilience of the valve 6, i.e., the valve 6 is returned to its state when no load is applied.

If the valve 6 is disposed closer to the one side surface 3d of the vane 3 as shown in FIG. 21, the rotary damper D6 becomes the one-way damper in which the rotary damper D6 exhibits the braking force in one direction only when the vane 3 rocks in the one direction. On the other hand, the valves 6 are disposed on opposite sides of the vane 3 (not shown), the rotary damper D6 becomes the two-way damper in which the rotary damper D6 exhibits the braking force not only when the vane 3 rocks in the one direction but also when the vane 3 rocks in the opposite direction.

The rotary damper D6 having the above-described structure is used such that the casing 1 is fixed to the stationary portion and the shaft which rotates together with the subject to be controlled is inserted into the hollow portion 7a of the rotor 7, and the rotor 7 is connected to the subject to be controlled through the shaft.

If the subject to be controlled is rotated in the one direction, the rotor 7 connected to the subject to be controlled is rotated in the clockwise direction in FIG. 21, and as the rotor 7 rotates, the vane 3 rocks in the clockwise direction like the rotor 7. With this, the pressure-receiving surface 6n of the valve 6 receives the pressure of the viscous fluid charged into the fluid chamber 2.

At that time, if the load applied to the rotary damper D6 is small, the pressure of the viscous fluid is also small and thus, even if the pressure-receiving surface 6n receives the pressure of the viscous fluid, the valve 6 is deformed only slightly, and only a portion of the fluid passage 5 is closed by the valve 6. On the other hand, if the load applied to the rotary damper D6 is great, the pressure of the viscous fluid is also great, and the valve 6 is deformed greater than that when the load is small, and more portion of the fluid passage 5 is closed by the valve 6 than that when the load is small. If the load applied to the rotary damper D6 exceeds the predetermined value, the valve 6 is further deformed largely, the opposed surface 6m comes into intimate contact with the one side surface 3d of the vane 3, thereby completely closing the fluid passage 5.

As described above, the deforming degree of the valve 6 is varied in accordance with the variation in load. Therefore, as the load is increased, the fluid passage 5 is automatically closed gradually, and it is possible to limit the flow rate of the viscous fluid moving through the fluid passage 5 such that the flow rate is gradually reduced. Here, the term "automatically" means "without operating the rotary damper from outside". Thus, according to the rotary damper D6 having such a valve 6, it is possible to automatically adjust the magnitude of the braking force exhibited in accordance with variation in load such that when the load is small, the exhibited braking force becomes small, and when the load is great, the exhibited braking force becomes great. Thus, when the magnitude of the load is varied, it is possible to reduce the variation in rotation speed of the subject to be controlled to an extremely small value without operating the rotary damper D6.

In FIG. 21, when the vane 3 rocks in the counterclockwise direction, since the valve 6 opens the fluid passage 5, the flow rate of the viscous fluid is not limited by the valve 6 and the viscous fluid can move through the fluid passage 5. Therefore, the resistance of the viscous fluid becomes extremely small and thus, the subject to be controlled rotates without being affected by the braking force exhibited by the rotary damper D6.

Since the valve 6 employed in this embodiment is integrally formed on the vane 3, the number of parts can be reduced as compared with the conventional rotary damper, and the assembling procedure of the valve 6 is unnecessary. Therefore, the producing cost can be reduced. When the check valve is formed as an independent member and then, the check valve is assembled as one constituent part of the rotary damper as in the conventional technique, there is an adverse possibility that an operator forgets about assembling the check valve in the producing line, but by integrally forming the valve 6 and the vane 3 together, such possibility can be eliminated completely.

Embodiment 7

Figure 26:
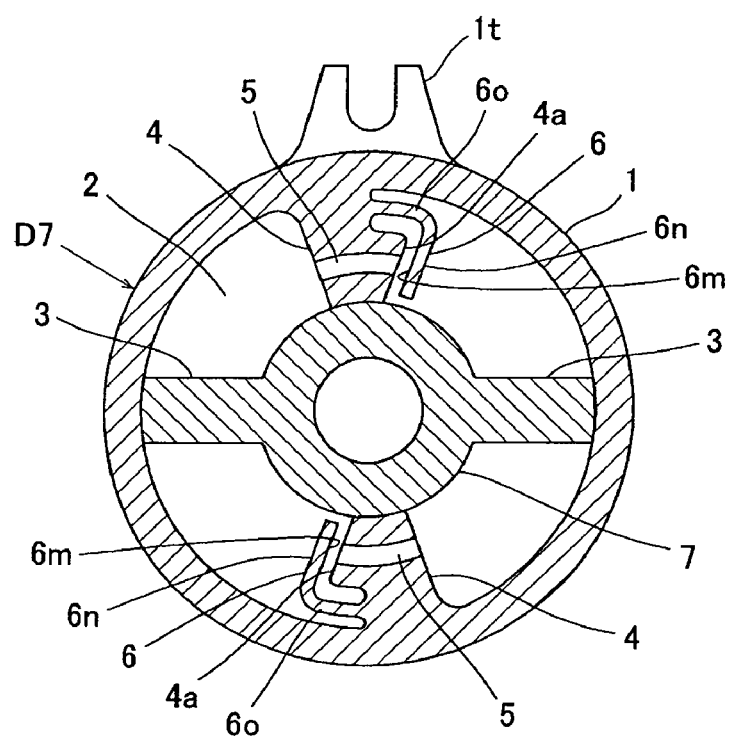
FIG. 26 shows an internal structure of a rotary damper according to an embodiment 7.

As shown in FIG. 26, a rotary damper D7 of the embodiment 7 is different from the rotary damper D6 of the embodiment 6 in that the partition walls 4 are formed with the fluid passages 5, and the valves 6 are integrally formed on the partition walls 4.

As shown in FIG. 26, when the fluid passages 5 are formed in the partition walls 4 as in this embodiment, the valve 6 includes a surface (opposed surface) 6m which is opposed to the one side surface 4a of the partition wall 4 and which has an area capable of closing the fluid passage 5, and a surface (pressure-receiving surface) 6n which is located on the opposite side from the opposed surface 6m and which receives the pressure of the viscous fluid as the vane 3 rocks. The valve 6 is integrally formed on the partition wall 4 such that a portion of the valve 6 other than the root 6o projecting from the one side surface 4a of the partition wall 4 is not related to any portion of the partition wall 4. The number of fluid passages 5 is not limited, and one partition wall 4 may be formed with a plurality of fluid passages 5.

When no load is applied, since the valve 6 is in a state in which the opposed surface 6m is separated from the one side surface 4a of the partition wall 4 at the constant distance, when the valve 6 opens the fluid passage 5 and a predetermined or higher load is applied to the rotary damper D7, the pressure-receiving surface 6n receives the pressure of the viscous fluid generated at that time to deform the valve 6, the opposed surface 6m comes into intimate contact with the one side surface 4a of the partition wall 4 to close the fluid passage 5.

If the valves 6 are disposed on the side of the one side surfaces 4a of the partition walls 4 as shown in FIG. 26, the rotary damper D7 becomes the one-way damper in which the rotary damper D7 exhibits the braking force in one direction only when the vane 3 rocks in the one direction. On the other hand, the valves 6 are disposed on opposite sides of the partition wall 4 (not shown), the rotary damper D7 becomes the two-way damper in which the rotary damper D7 exhibits the braking force not only when the vane 3 rocks in the one direction but also when the vane 3 rocks in the opposite direction.

According to the rotary damper D7 having the above-described structure also, the same effect as that of the rotary damper D6 of the embodiment 6 can be obtained.

Embodiment 8

Figure 27:
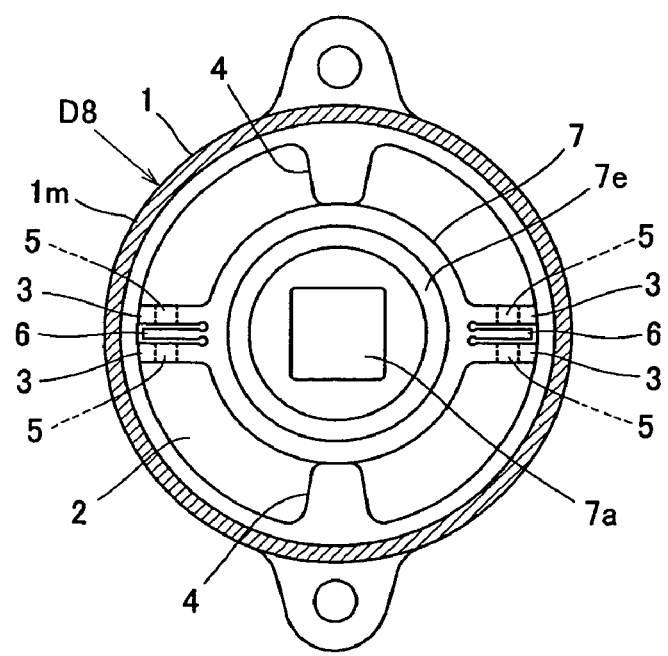
FIG. 27 shows an internal structure of a rotary damper according to an embodiment 8.

As shown in FIG. 27, a rotary damper D8 according to the embodiment 8 is different from the rotary damper D6 of the embodiment 6 in that each of the vanes 3 is divided into two pieces, and a valve 6 is disposed in a gap formed between the divided pieces. Similarly, a structure in which each of the partition walls 4 is divided into two pieces, and the valve 6 is disposed in the gap formed between the divided pieces may also be employed. Also when such a structure is employed, the valve 6 or the vane 3 is integrally formed on the partition wall 4.

According to the rotary damper D8 having the above-described structure, the valve 6 is deformed in accordance with the magnitude of the pressure of the viscous fluid, and the flow rate of the viscous fluid passing through the fluid passage 5 can automatically be varied in correspondence with the variation in load irrespective of the rocking direction of the vane 3. Therefore, it is possible to reduce the variation of rotation speed of the subject to be controlled to an extremely small value irrespective of the rotation direction of the subject to be controlled without operating the rotary damper D8.

Embodiment 9

Figure 28:
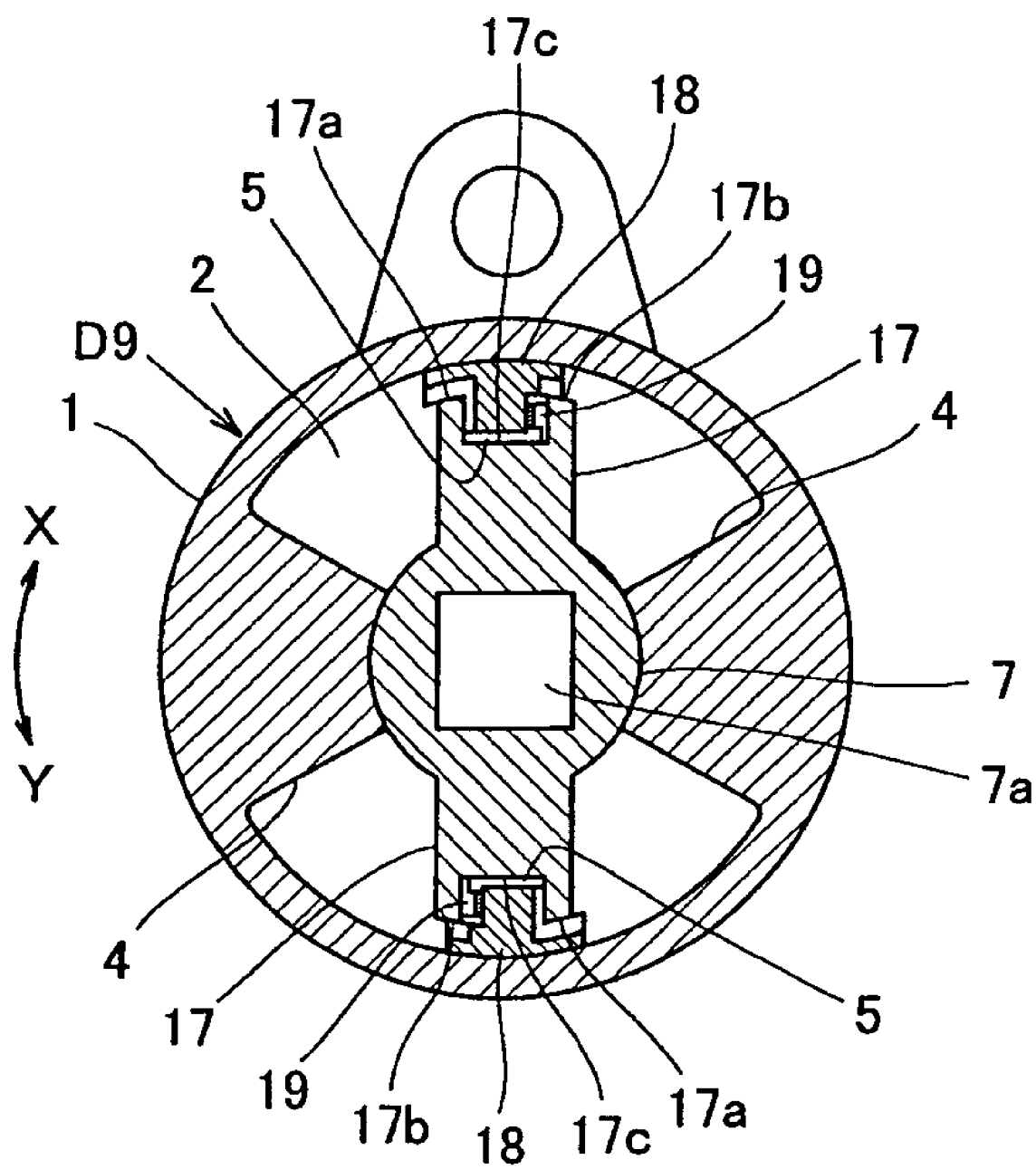
FIG. 28 shows an internal structure of a rotary damper according to an embodiment 9.

FIG. 28 shows an internal structure of a rotary damper D9 of the embodiment 9. As shown in FIG. 28, the rotary damper D9 comprises a rotor 7 provided in the casing 1, the fluid chambers 2 each partitioned by the partition wall 4 provided between the rotor 7 and the casing 1 and into which viscous fluid is charged, valve bodies 18 each projecting from the rotor 7 and capable of engaging with an engaging portion 17 disposed in the fluid chamber 2 with a play, fluid passages 5 each formed between the valve body 18 and the engaging portion 17, and resilient members 19 each provided in the fluid passage 5.

The partition walls 4 projecting from the inner peripheral surface of the casing 1 toward the axial direction are provided in the casing 1. The tip end surface of each the partition wall 4 is formed into a curved surface so that the outer peripheral surface of the rotor 7 slides on the tip end surface. The rotor 7 includes the hollow portion 7a which is hollow along the axis of the rotor 7. A shaft which serves as a rotation center of the subject to be controlled is inserted into the hollow portion 7a.

The engaging portion 17 projects from the rotor 7 such that the engaging portion 17 projects from the outer peripheral surface of the rotor 7 toward the inner peripheral surface of the casing 1. The engaging portion 17 is integrally formed on the rotor 7 such that the engaging portion 17 constitutes a portion of the rotor 7, and a length of the engaging portion 17 along the axial direction is set such that when the rotor 7 is relatively rotated with respect to the casing 1, one of the end surfaces of the engaging portion 17 slides on a closing portion (not shown) which closes the opening of the casing 1 and the other end surface slides on a bottom wall of the casing 1. A length of the engaging portion 17 is set shorter than a distance from the inner peripheral surface of the casing 1 to the outer peripheral surface of the rotor 7 in the radial direction. The engaging portion 17 has bifurcated tip ends, and a gap between the bifurcated tip ends 17a and 17b forms an engaging groove 17c into which a projection 18b of the valve body 18 engages.

The rotor 7 is rotatably provided in the casing 1. With this structure, a space partitioned by the partition wall 4 is formed between the rotor 7 and the casing 1. This space is the fluid chamber 2, and viscous fluid such as silicon oil is charged into the fluid chamber 2. The engaging portion 17 is disposed in the fluid chamber 2.

As shown in FIG. 29, the valve body 18 is formed into a substantially T-shape comprising an arc portion 18a having a substantially arc shape as viewed from above, and a projection 18b projecting from a substantially central portion of the arc portion 18a opposed to the rotor 7. Backflow grooves (first to third backflow grooves 18c to 18e) are formed in opposed surfaces of the arc portion 18a and the engaging portion 17 with respect to the projection 18b and one side surface of the projection 18b. The first to third backflow grooves 18c to 18e are formed at substantially central portions of the above-described surfaces. Instead of forming the first to third backflow grooves 18c to 18e in the opposed surface of the arc portion 18a with respect to the projection 18b, the first to third backflow grooves 18c to 18e may be formed in the tip ends 17a and 17b of the engaging portion 17.

A length h of the valve body 18 in its axial direction is substantially the same as the length of the engaging portion 17 in its axial direction, and a width d of the arc portion 18a is set wider so that the arc portion 18a comes into contact with the tip ends 17a and 17b of the engaging portion 17.

The valve body 18 having the above-described shape is provided in the fluid chamber 2 such that the arc portion 18a is disposed between the engaging portion 17 and the inner peripheral surface of the casing 1 and the projection 18b is disposed in the engaging groove 17c with a play.

By disposing the valve body 18 in this manner, the fluid passage 5 comprising a gap defined by the first to third backflow grooves 18c to 18e, the tip end surface of the projection 18b and the bottom surface of the engaging groove 32f is formed between the valve body 18 and the engaging portion 17. The viscous fluid can pass through the fluid passage 5. Since the width d of the arc portion 18a is set wide so that the arc portion 18a comes into contact with the tip ends 17a and 17b of the engaging portion 17, when the casing 1 is rotated around the rotor 7 in the braking force exhibiting direction X, a sliding area between the outer peripheral surface of the arc portion 18a and the inner peripheral surface of the casing 1 is large and thus, the adhesion between the valve body 18a and the casing 1 is enhanced, and the sealing performance can be enhanced.

As shown in FIG. 30 the resilient member 19 comprises a leaf spring which is curved such that its one surface projects. Although a member which is bent into a substantially L-shape as viewed from side is employed as the resilient member 19 in this embodiment, the resilient member 19 is not limited to this, and a member which is bent into an arc shape as viewed from side can also be employed.

It is preferable that the resilient member 19 has a notch 19a which passes through the resilient member 19 in its thickness direction. With this notch 19a, when the casing 1 rotates around the rotor 7 in the non-braking force exhibiting direction Y, the viscous fluid moves through the notch 19a easily, and it is possible to present the viscous fluid generated when the viscous fluid passes through the fluid passage 5 from increasing as compared with a case in which no notch 19a exists. With this, it is possible to reduce the viscous fluid generated at that time to an extremely low level. The same effect can also be obtained by forming a hole passing through the resilient member 19 in its thickness direction instead of the notch 19a.

Figure 32:
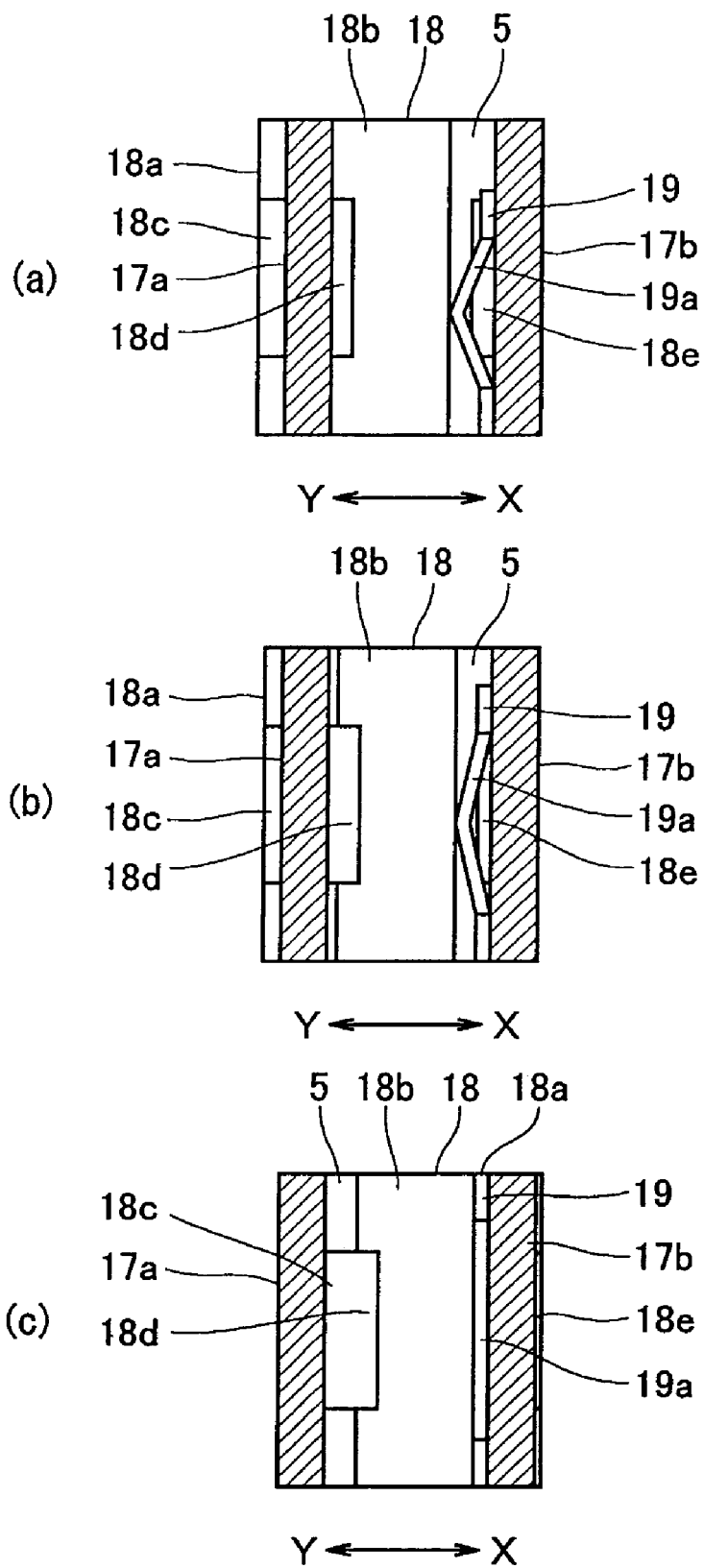
FIG. 32 are diagram for explaining effects of the valve body and the resilient member employed in the embodiment 9.

The resilient member 19 is provided in the fluid passage 5 such that the fluid passage 5 is not closed when no load is applied. More concretely, as shown in FIGS. 31 and 32, the resilient member 19 is disposed in the fluid passage 5 such that one surface of the resilient member 19 abuts against the other side surface of the projection 18b of the valve body 18, and the other surface abuts against an inner surface of the other tip end 17b of the bifurcated tip ends of the engaging portion 17 opposed to the other side surface of the 18b. It is of course possible to reverse the positional relation between the one surface and the other surface of the resilient member 19, and to dispose the resilient member 19 in the fluid passage 5.

The rotary damper D9 having the above-described structure functions as follow. That is, when the rotary damper D9 is applied to a subject to be controlled which opens and closes and when the subject to be controlled is closed, as shown in FIGS. 31(a) and 32(a), the valve body 18 is biased by the resilient member 19 disposed in the fluid passage 5, one of the side surfaces of the projection 18b is in abutment against the inner surface of the one tip end 17a of the bifurcated tip ends formed on the engaging portion 17. When the valve body 18 is in this position, the fluid passage 5 is fully opened.

Here, the rotary damper D9 is disposed such that the casing 1 is fixed to the subject to be controlled, the rotor 7 is connected to the support shaft which is a rotation center of the subject to be controlled, and as the subject to be controlled rotates, the casing 1 rotates around the rotor 7.

If the subject to be controlled rotates in the opening direction, the casing 1 rotates in the braking force exhibiting direction X (see FIG. 28). With this, the partition wall 4 pushes the viscous fluid in the fluid chamber 2. Since the rotor 7 is provided such that the rotor 7 does not rotates even if the subject to be controlled rotates, if the partition wall 4 pushes the viscous fluid, the valve body 18 receives the pressure of the viscous fluid, the valve body 18 moves in the braking force exhibiting direction X while pressurizing the resilient member 19. With this, the resilient member 19 is deformed as shown in FIGS. 31(b) and 32(b), the gap between the opposed surfaces of the projection 18b of the valve body 18 and the other tip end 17b of the engaging portion 17 is reduced, and an opening area of the third backflow groove 18e in the fluid passage 5 is reduced. Therefore, the flow rate of the viscous fluid passing through the fluid passage 5 is limited. The limiting degree of the flow rate of the viscous fluid is proportional to the magnitude of the deformation of the resilient member 19, and as the deformation of the resilient member 19 is greater, the flow rate of the viscous fluid passing through the fluid passage 5 is reduced.

Therefore, when the rotational moment of the subject to be controlled is small and the load applied to the rotary damper D9 is small, the pressure of the viscous fluid received by the valve body 18 is also small, and deformation of the resilient member 19 caused when the valve body 18 moves is also small. Therefore, a resistance generated when the viscous fluid passes through the fluid passage 5 is also small and the braking force exhibited by the rotary damper D9 is also small. On the other hand, when the rotational moment of the subject to be controlled is great and the load applied to the rotary damper D9 is great, the pressure of the viscous fluid received by the valve body 18 is high and the deformation of the resilient member 19 caused when the valve body 18 moves is also great. Therefore, the resistance generated when the viscous fluid passes through the fluid passage 5 is also great and the braking force exhibited by the rotary damper D9 is also great.

According to this rotary damper D9, as the load is increased, the fluid passage 5 can automatically be closed gradually. Therefore, it is possible to limit the flow rate of the viscous fluid passing through the fluid passage 5 such that the flow rate is gradually reduced. Thus, when the magnitude of the load is varied, it is possible to reduce the variation of the rotation speed of the subject to be controlled to an extremely small value even if the rotary damper D9 is not operated at all.

When a predetermined or higher load is applied, as shown in FIGS. 31(c) and 32(c), the resilient member 19 is largely deformed and the fluid passage 5 is completely closed such that the gap between the opposed surfaces of the projection 18b of the valve body 18 and the other tip end 17b of the engaging portion 17 is eliminated. With this, the viscous fluid can not move through the fluid passage 5 and thus, the rotary damper D9 exhibits greater braking force.

When the subject to be controlled is closed on the contrary, as the subject to be controlled rotates in its closing direction, the casing 1 rotates in the non-braking force exhibiting direction Y (see FIG. 28). With this, the partition wall 4 pushes the viscous fluid in the fluid chamber 2 in the opposite direction. The valve body 18 receives the pressure of the viscous fluid pushed by the partition wall 4 and the biasing force of the resilient member 19, and the valve body 18 moves in the non-braking force exhibiting direction Y, and the valve body 18 is returned to its original position shown in FIGS. 31(a) and 32(a). With this, the fluid passage 5 is brought into the fully opened state. Therefore, a large amount of viscous fluid moves through the fluid passage 5 and thus, the rotary damper D9 does not exhibit a braking force to a degree that affects the rotational motion of the subject to be controlled.

The present invention is not limited to the above-described structure, and the valve body 18 may be formed into a substantially rectangular solid having a width smaller than that of the engaging groove 17c, and the backflow groove through which the viscous fluid can pass may be formed in two intersecting surfaces. The partition wall 4 may project from the outer peripheral surface of the rotor 7, the tip end surface thereof may slide on the inner peripheral surface of the casing 1, and the inner peripheral surface of the casing 1 may be provided with the engaging portion 17 having the engaging groove 17c. The engaging portion 17 may be formed into a projecting shape, and the valve body 18 may be formed into a recess shape.

The present invention provides an auto part having the rotary damper according to the embodiment. Here, the term "auto part" is not especially limited, but typical examples of the auto part are a glove box, a console box, a reclining seat and an arm rest. The auto part will be explained in detail below based on embodiments illustrated in the drawings.

Figure 33:
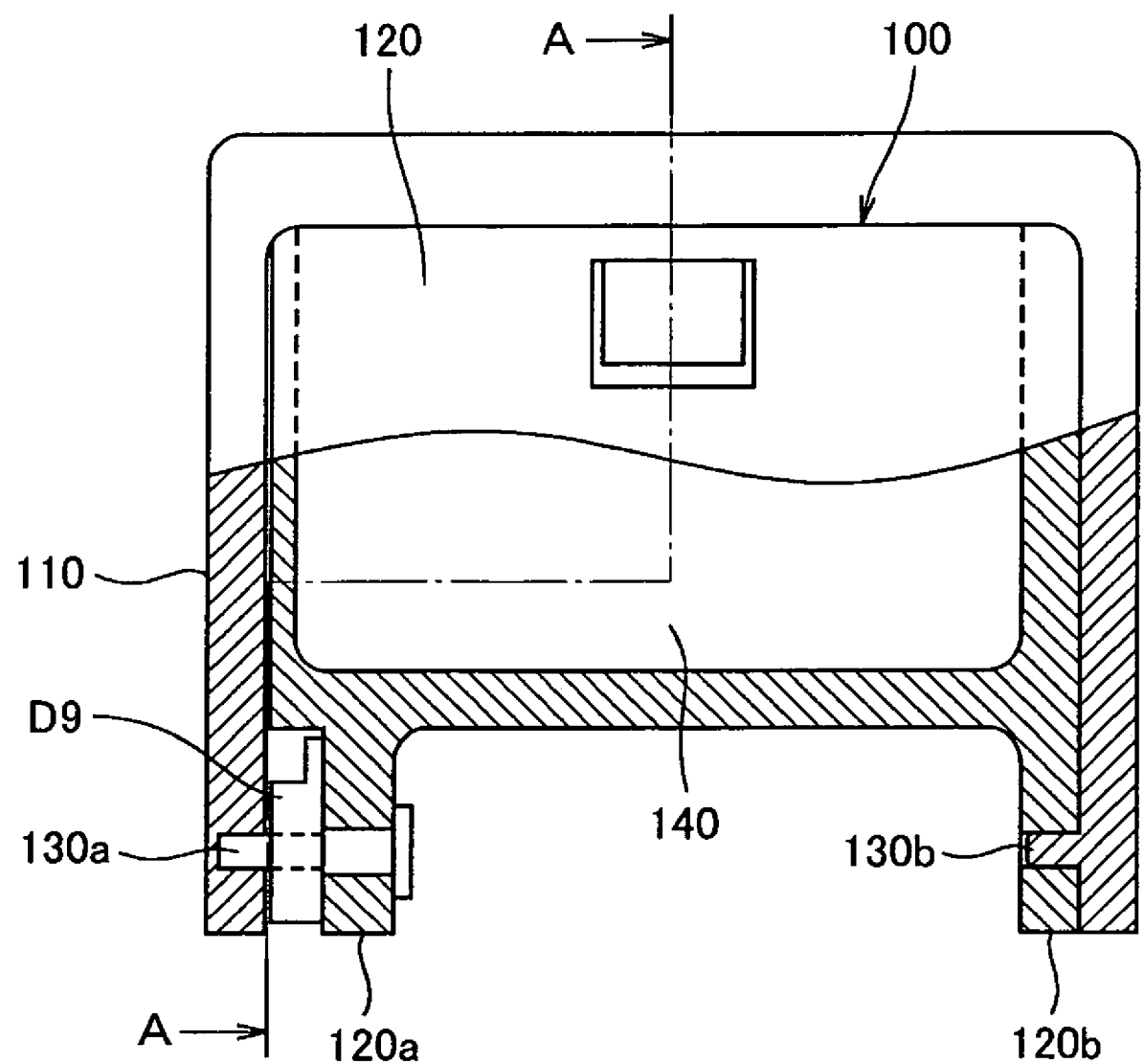
FIG. 33 shows a glove box according to an embodiment of the present invention.
Figure 34:
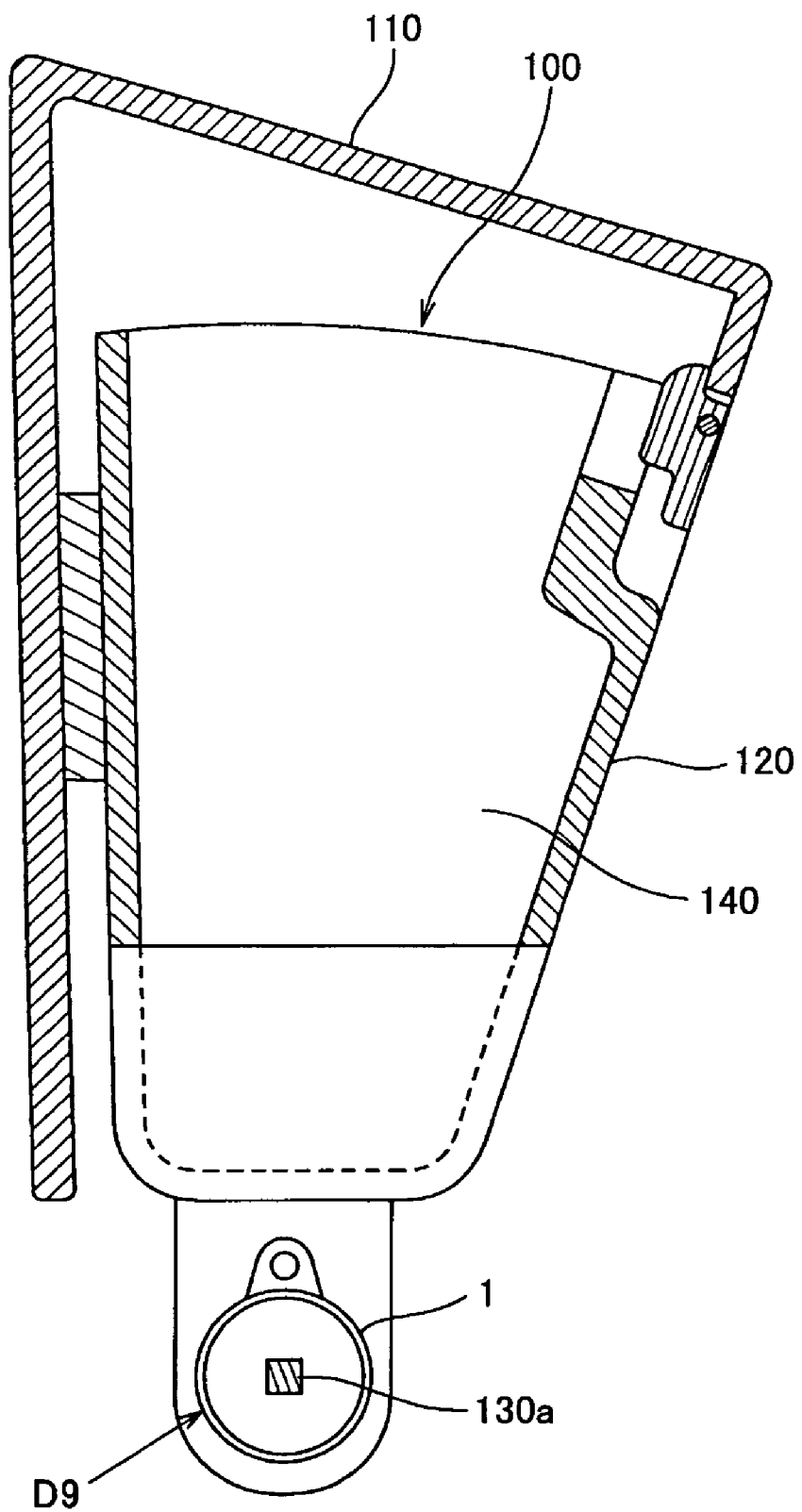
FIG. 34 is a sectional view taken along A—A line in FIG. 33.

FIGS. 33 and 34 show the glove box disposed in an opening formed in an instrument panel of an automobile. If the rotary damper D9 of the embodiment 9 is applied to control the rotational motion of the glove box 100, the rotary damper D9 is provided on a connected portion between the glove box 100 and its support body (instrument panel supporting the glove box 100) 110.

The box body 120 of the glove box 100 is provided at its lower opposite sides with base portions 120a and 120b. The base portions 120a and 120b are connected to a support body 110 which supports the box body 120 through support shafts 130a and 130b, respectively. The box body 120 rotates around the support shafts 130a and 130b so that an accommodating section 140 which is a space formed in the box body 120 for accommodating articles rotates.

The casing 1 of the rotary damper D9 is fixed to the box body 120 of the glove box 100, and the rotor 7 is connected to the support shaft 130a. Although the rotary damper D9 is provided only on one side of the box body 120 in the embodiment shown in FIG. 33, the rotary dampers D9 may be disposed on the opposite sides of the box body 120 of course. The casing 1 of the rotary damper D9 may be fixed to the support body 110. In this case, the rotor 7 is connected to the support shaft 130a so that the rotor 7 can rotate in the casing 1 as the box body 120 rotates.

According to the glove box 100 having the above-described structure, if the box body 120 rotates in its opening direction, the accommodating section 140 turns. At that time, the magnitude of the rotational moment of the box body 120 is different between a case in which an article is accommodated in the accommodating section 140 and a case in which no article is accommodated in the accommodating section 140. Even if the article is accommodated in the accommodating section 140, the magnitude of the rotational moment of the box body 120 is varied depending upon the weight of the article. Therefore, a load applied to the rotary damper D9 is varied depending upon the presence or absence of the article accommodated in the accommodating section 140 and the weight of the article. According to the rotary damper D9, however, since the exhibited braking force can automatically be adjusted in accordance with the variation in load, the variation in rotation speed caused by variation in rotational moment of the box body 120 can be reduced to an extremely small value even if the rotary damper D9 is not operated at all.

On the other hand, when the box body 120 is to be closed, since the damping function of the rotary damper D9 does not act, the box body 120 can rotate freely.

Figure 35:
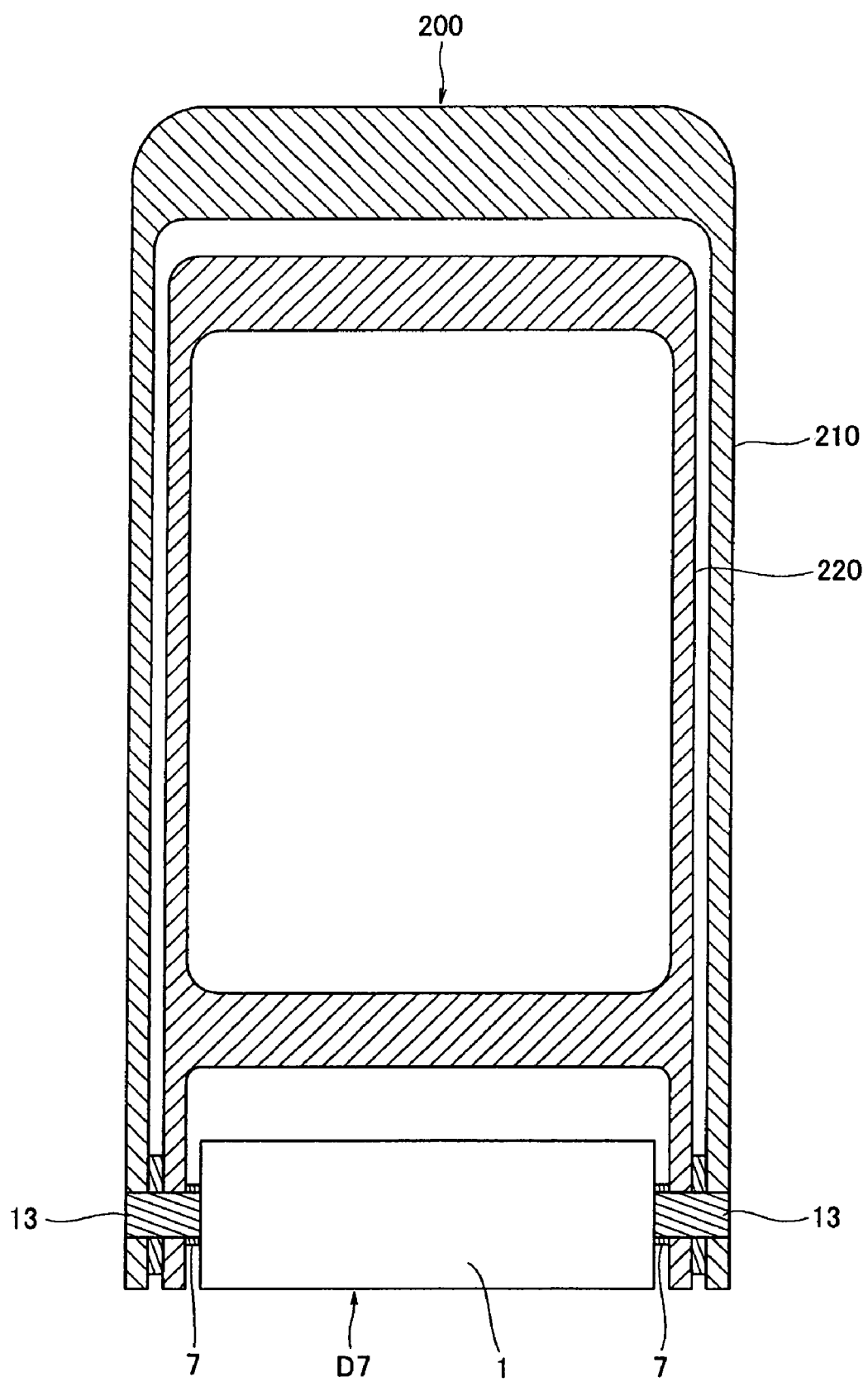
FIG. 35 shows a console box of the embodiment of the invention.
Figure 36:
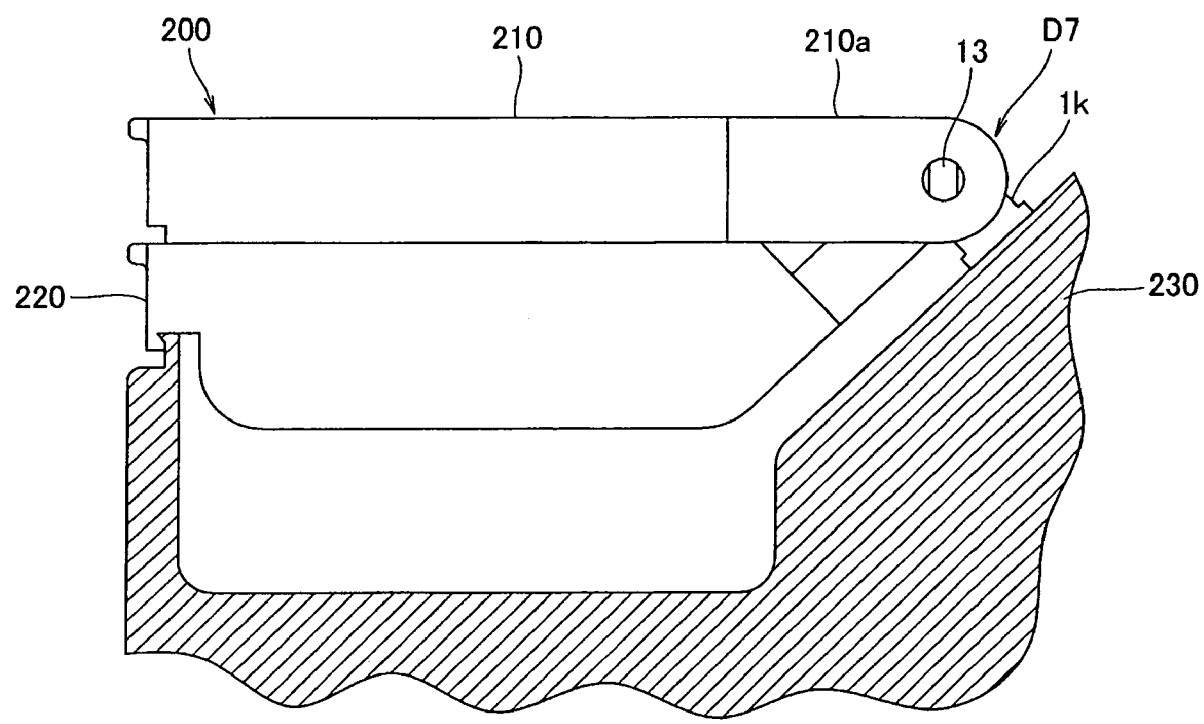
FIG. 36 shows the console box of the embodiment of the invention.
Figure 37:
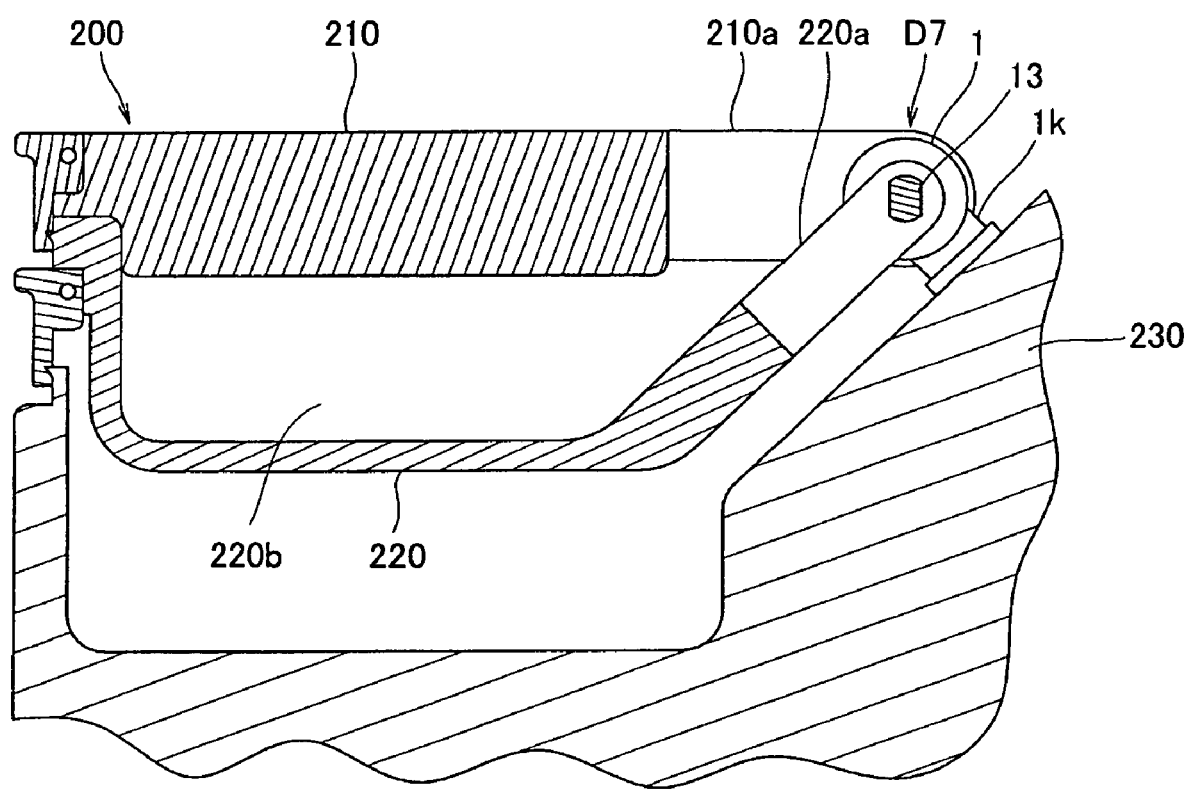
FIG. 37 shows the console box of the embodiment of the invention.

FIGS. 35 and 37 show the console box disposed in the automobile. The console box 200 includes a double lid structure comprising an outer lid 210 and an inner lid 220. If the rotary damper D3 of the embodiment 3 is applied to control the rotational motion of the double structure, a leg 1k projecting from the casing 1 of the rotary damper D3 is mounted to a body portion 230 of the console box 200. With this, the casing 1 is fixed, a base end of a frame 220a constituting the inner lid 220 and a base end of a frame 210a constituting the outer lid 210 are connected to the inner shaft 13.

As shown in FIG. 37, the inner lid 220 of the console box 200 includes an accommodating section 220b of an article, and its weight is largely varied between a case in which sufficient articles are accommodated and a case in which no article is accommodated. When the inner lid 220 and the outer lid 210 are closed together, the weight of the outer lid 210 is also added to the weight of the inner lid 220. Therefore, the rotational moment of the inner lid 220 is largely varied between a case in which no article is accommodated in the inner lid 220 and only the inner lid 220 is closed and a case in which sufficient articles are accommodated in the inner lid 220 and the inner lid 220 and the outer lid 210 are closed together.

According to the rotary damper D3, however, the magnitude of the exhibited braking force can automatically be adjusted in accordance with the variation in load such that when the load is small, the exhibited braking force becomes small, and when the load is great, the exhibited braking force becomes great. Therefore, when the rotational moment of the inner lid 220 is varied, it is possible to reduce the variation in rotation speed of the inner lid 220 to an extremely small value without operating the rotary damper D3.

When the inner lid 220 is opened, since the damping function of the rotary damper D3 does not act, the inner lid 220 can rotate smoothly.

Further, since the rotary damper D3 includes the click mechanism 12, the inner lid 220 can be independent in its fully opened position.

Figure 38:
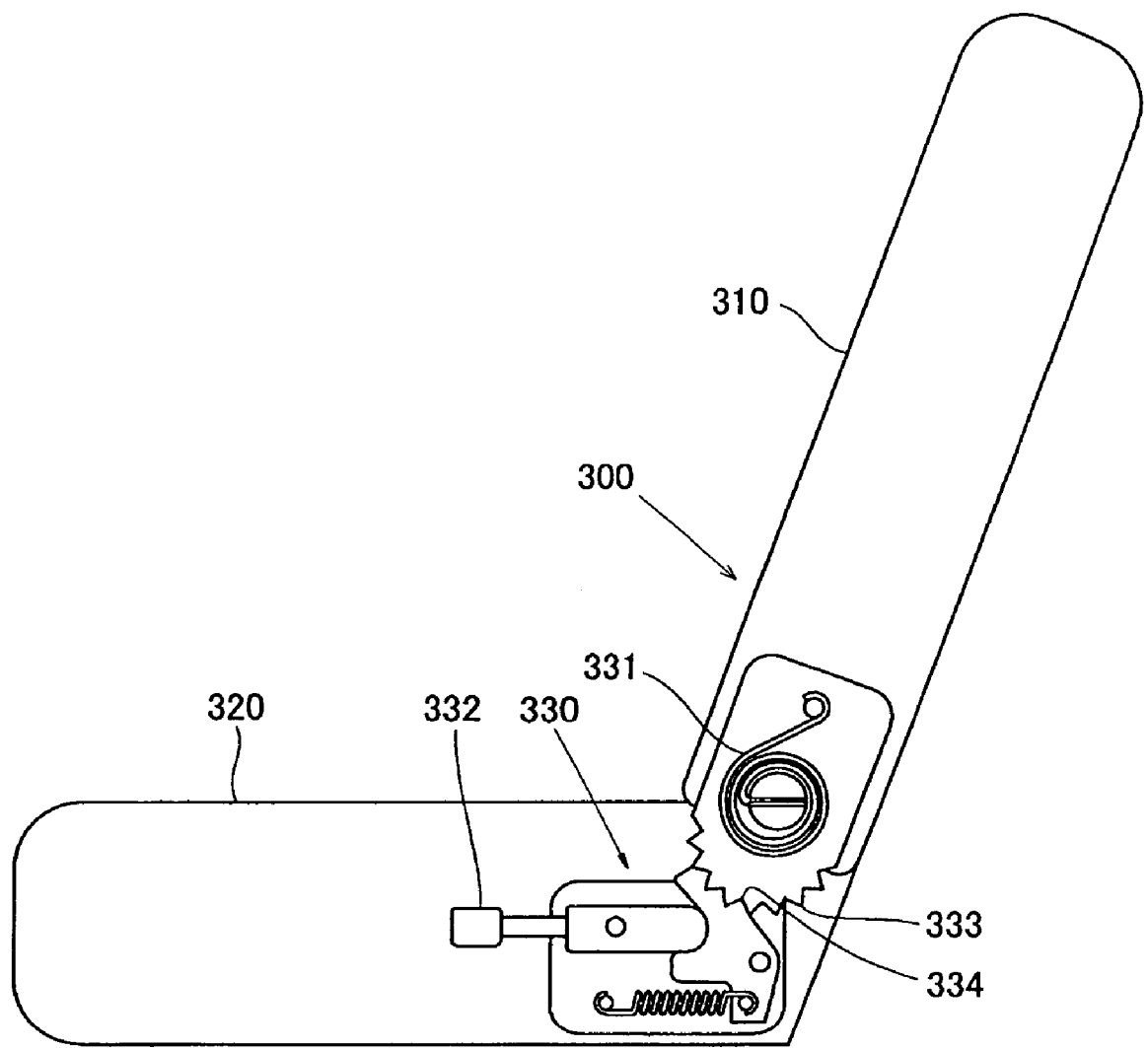
FIG. 38 is a schematic right side view showing a reclining seat of the embodiment of the invention.
Figure 39:
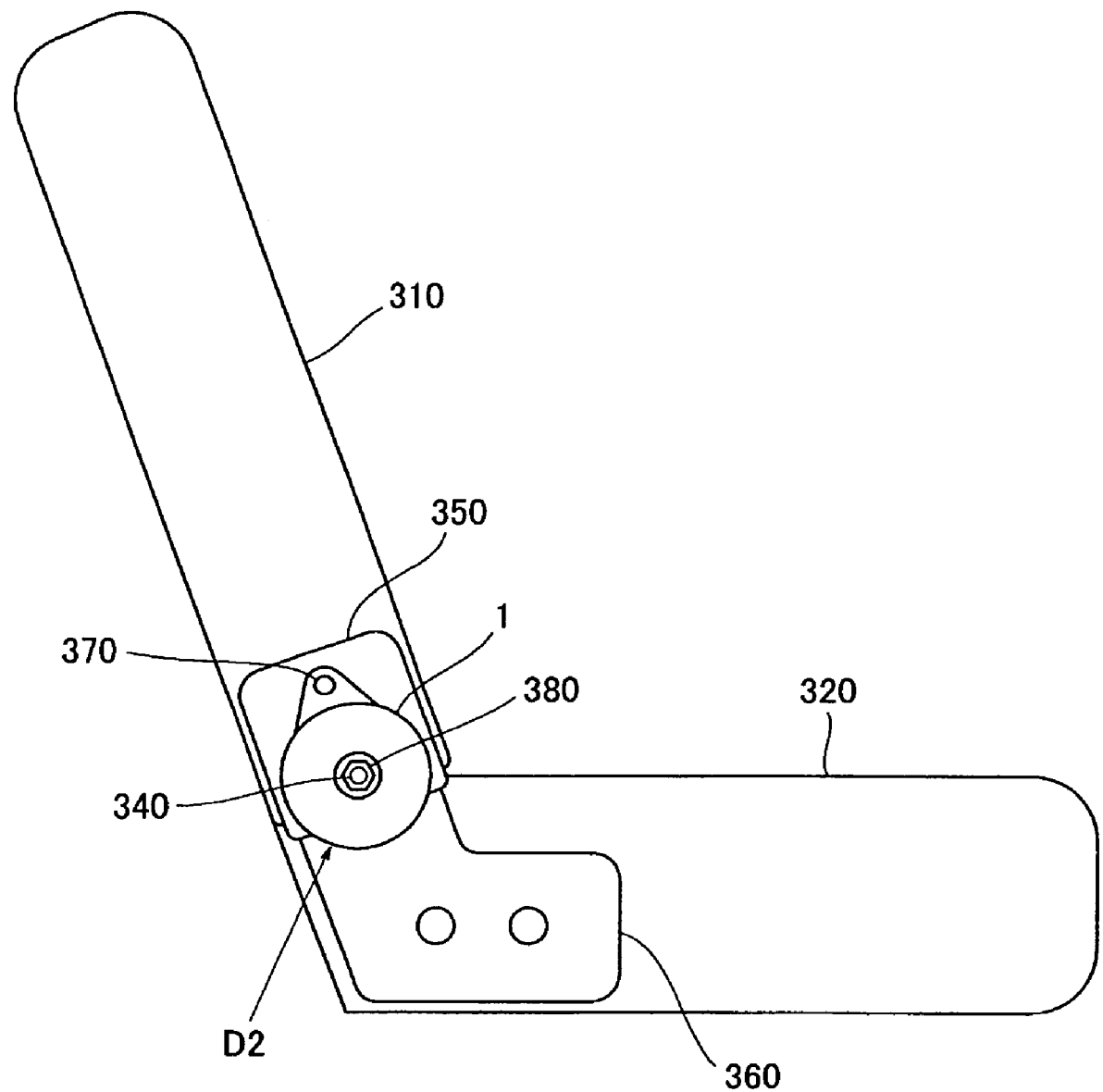
FIG. 39 is a schematic left side view showing a reclining seat of the embodiment of the invention.
Figure 40:
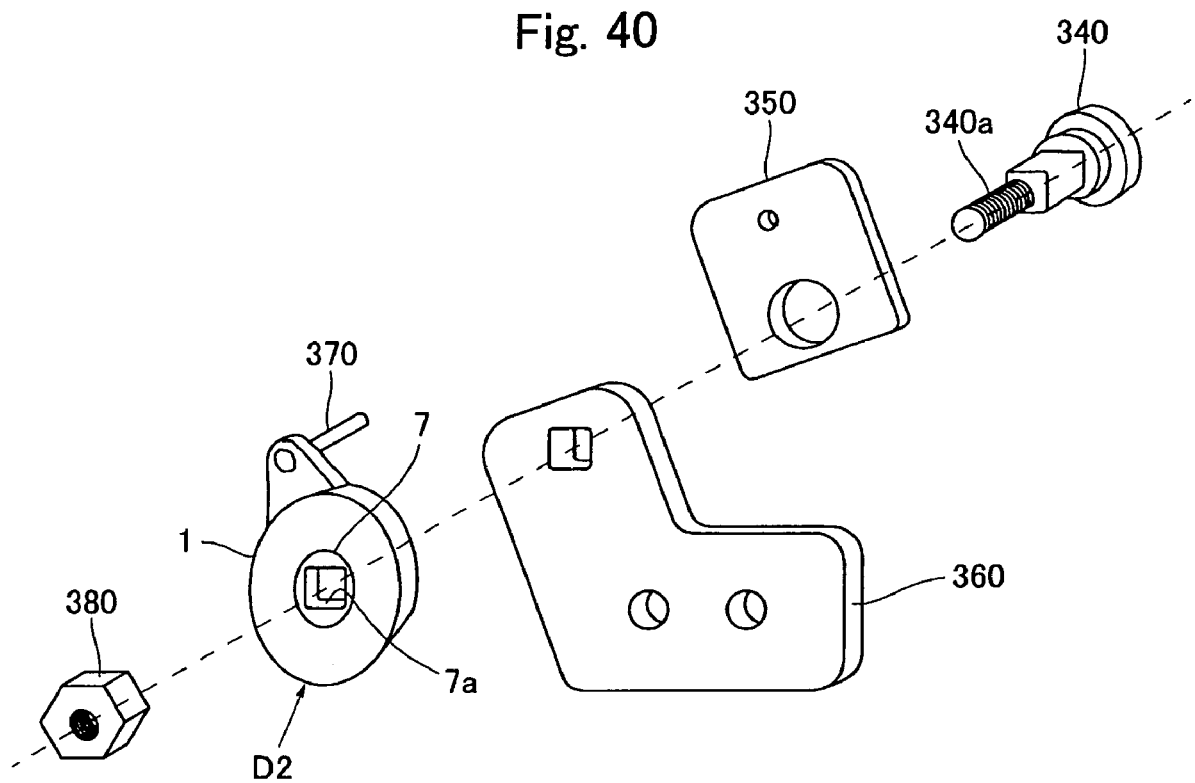
FIG. 40 is a diagram for explaining a mounting method of the rotary damper employed for the reclining seat of the embodiment of the invention.

FIGS. 38 and 40 shows a reclining seat disposed in an automobile. If the rotary damper, D2 of the embodiment 2 is applied to control the rotational motion of the seat back 310 of the reclining seat 300, the rotary damper D2 is disposed on one of connected portions of the opposite sides between a seat back 310 and a seat cushion 320 where the reclining mechanism 330 is not provided shown in FIG. 39. More concretely, as shown in FIGS. 39 and 40, an upper hinge bracket 350 fixed to the seat back 310 is rotatably mounted on a support shaft 340 which supports the seat back 310, and a lower hinge bracket 360 fixed to the seat cushion 320 is mounted on an outer side of the upper hinge bracket 350, the rotary damper D2 is connected to the support shaft 340 from outside of the lower hinge bracket 360, and the casing 1 is connected to the upper hinge bracket 350 through a mounting screw 370 so that the casing 1 can rotate around the support shaft 340 as the seat back 310 rotates. In FIG. 40, a symbol 380 represents a nut which is threaded around a screw portion 340a formed on a tip end of the support shaft 340 for mounting the rotary damper D2 on the support shaft 340.

As shown in FIG. 38, a reclining mechanism 330 capable of adjusting a position (inclination angle) of the seat back 310 in stages is provided on one of the connected portions on opposite sides of the seat back 310 and the seat cushion 320. However, if only the reclining mechanism 330 is used, since the reclining mechanism 330 includes a spring member 331 which biases the seat back 310 forward, if an operating lever 332 is lifted up carelessly to release the locked state established by meshing gears 333 and 334, there is an adverse possibility that the seat back 310 abruptly rotates forwardly and collides against a seated passenger and offends the passenger.

In this regard, according to the reclining seat 300 having the rotary damper D2, the rotary damper D2 exhibits the braking force to the seat back 310 which turns forward, the rotational motion of the seat back 310 can be moderated against the biasing force of the spring member 331 and thus, this inconvenience can be overcome.

The rotational moment of the reclining seat 300 is varied between a case in which a head rest (not shown) is mounted on the seat back 310 and a case in which the head rest is detached. Therefore, the rotation speed of the seat back 310 is largely varied depending upon presence and absence of the head rest.

According to the rotary damper D2, however, it is possible to automatically adjust the magnitude of the exhibited braking force in accordance with the variation in load such that when the load is small, the exhibited braking force becomes small, and when the load is great, the exhibited braking force becomes great. Therefore, when the rotational moment of the seat back 310 is varied, it is possible to reduce the rotation speed of the seat back 310 to an extremely small value without operating the rotary damper D2 at all.

When the seat back 310 is rotated rearward, since the damping function of the rotary damper D2 does not act, the seat back 310 can be rotated with a small force.

Figure 41:
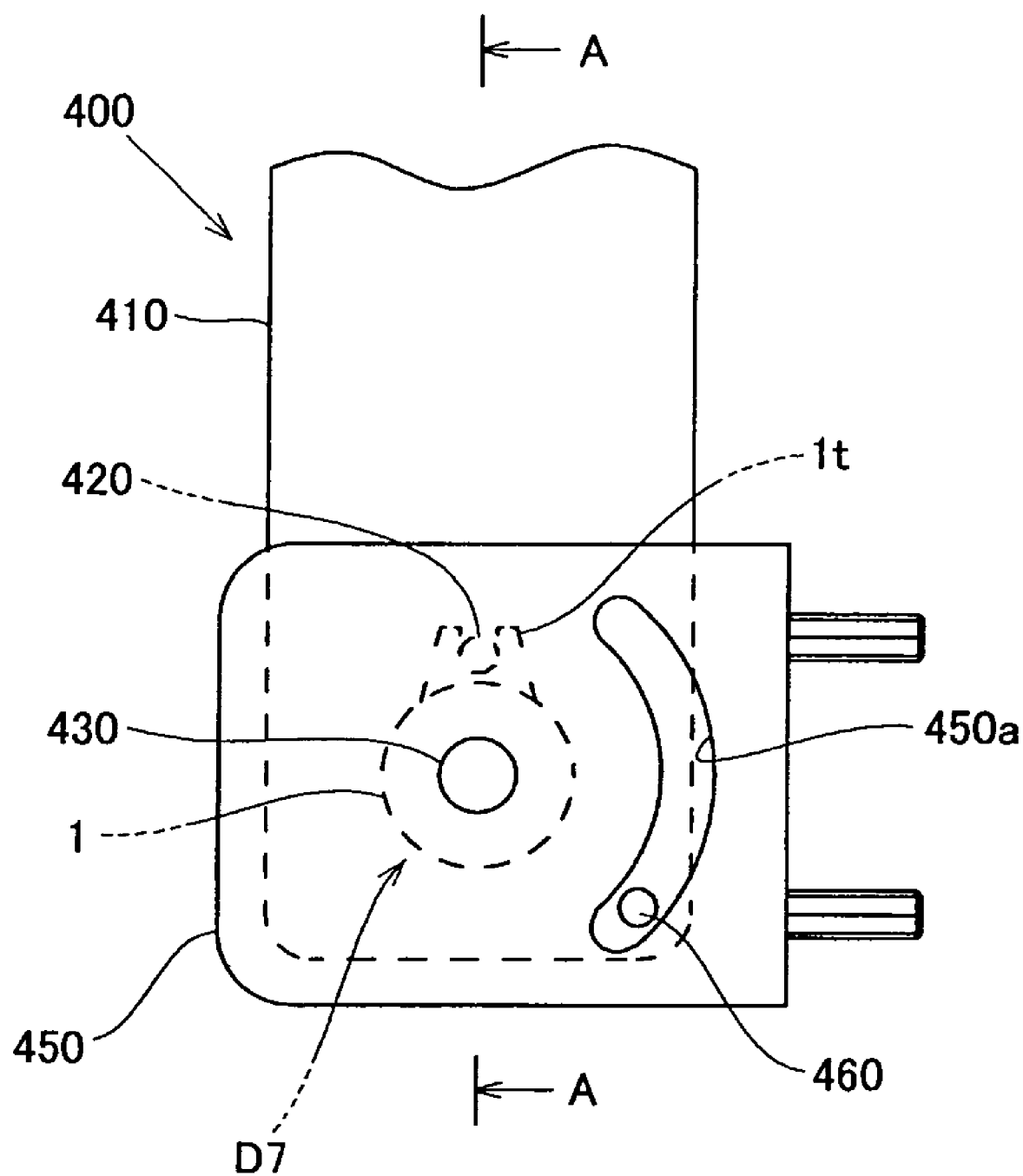
FIG. 41 is a right side view for showing an essential portion of an arm rest of the embodiment of the invention.
Figure 42:
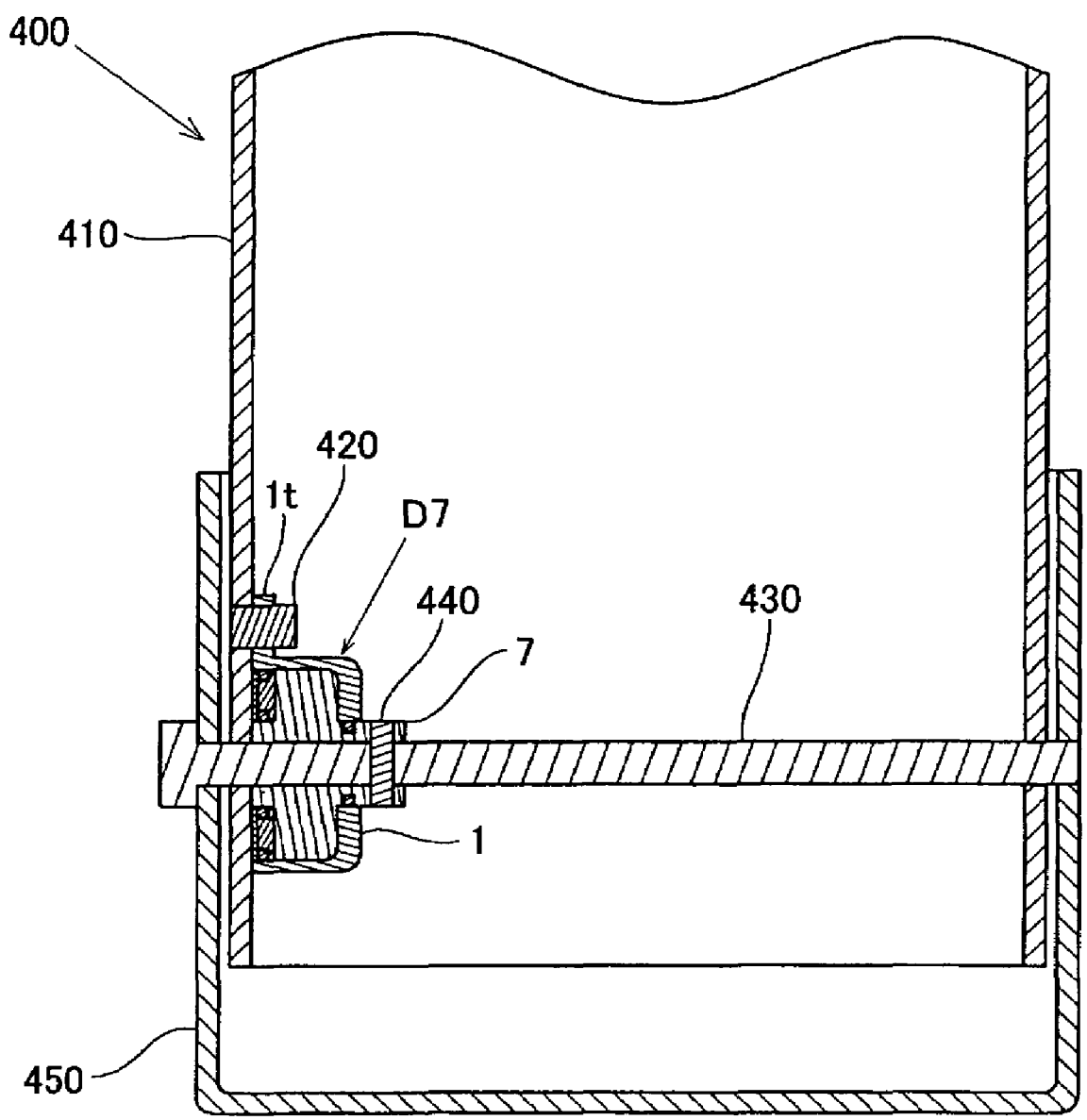
FIG. 42 is a sectional view taken along A—A line in FIG. 41.

FIGS. 41 and 42 shows an arm rest which can be accommodated in an accommodating recess formed in a front surface of the seat back which constitutes a rear seat of an automobile in a state in which the arm rest stands. If the rotary damper D7 of the embodiment 7 is applied to control the rotational motion of the arm rest 400, the rotary damper D7 is disposed inside of a body frame 410 of the arm rest 400, and a projection 1t projecting from an outer periphery of the casing 1 is engaged with an engaging pin 420 projecting from the body frame 410. With this, the casing 1 is fixed to the body frame 410 so that the casing 1 can turn around the support shaft 430 as the body frame 410 rotates in the longitudinal direction, and the rotor 7 is connected to the support shaft 430 using a connecting pin 440.

The body frame 410 of the arm rest 400 is turnably supported by the support shaft 430 which is supported by a bracket 450 mounted on a seat back (not shown) which constitutes a rear seat of an automobile. A guide bar 460 is provided in the body frame 410. Opposite ends of the guide bar 460 are disposed in arc guide grooves 450a formed in the bracket 450. A range in which the guide bar 460 can move in the guide groove 450a as the body frame 410 turns is set as a rotation angle range of the arm rest 400 in the longitudinal direction.

The arm rest 400 has such a structure that the arm rest 400 can be used as an arm rest of a passenger, and the arm rest 400 can accommodate an article. Therefore, the rotational moment of the arm rest 400 is varied between a case in which an article is accommodated and a case in which no article is accommodated. Thus, the rotation speed of the arm rest 400 is largely varied depending upon presence or absence of the article.

According to the rotary damper D7, however, it is possible to automatically adjust the magnitude of the exhibited braking force in accordance with the variation in load such that when the load is small, the exhibited braking force becomes small, and when the load is great, the exhibited braking force becomes great. Therefore, when the rotational moment of the arm rest 400 is varied, it is possible to reduce the rotation speed of the arm rest 400 to an extremely small value without operating the rotary damper D7 at all.

Further, when the arm rest 400 is used, the arm rest 400 which is accommodated in the accommodating recess (not shown) formed in the front surface of the seat back in its standing attitude is pulled out forward, and it is rotated forward. At that time, even if a user moves his or her hand off the arm rest 400, the arm rest 400 can rotate slowly by the damping function of the rotary damper D7, and the arm rest 400 can stop at its using attitude without generating an impact almost at all.

On the other hand, when the arm rest 400 is to be accommodated, since the damping function of the rotary damper D7 does not act, the arm rest 400 can be rotated with a small force.

The present invention provides a rotational motion assistant mechanism which is characterized in that it has a spring member which biases a subject to be controlled in one direction is provided with the rotary damper of the embodiment so that rotation of the subject to be controlled in one direction is delayed against stress of the spring member. The invention will be explained in detail based on an illustrated embodiment.

Figure 43:
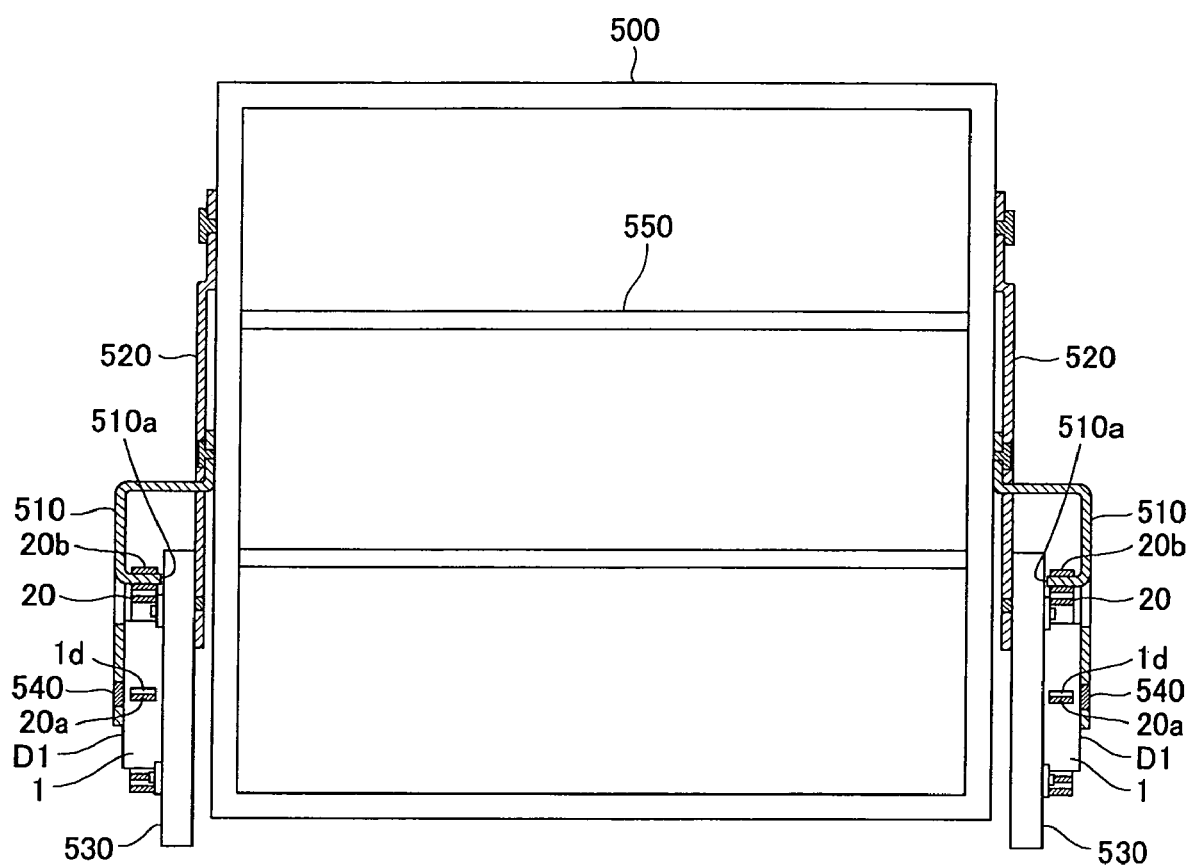
FIG. 43 is a front view showing a hoisting and lowering case having a rotational motion assistant mechanism of the embodiment of the invention.
Figure 45:
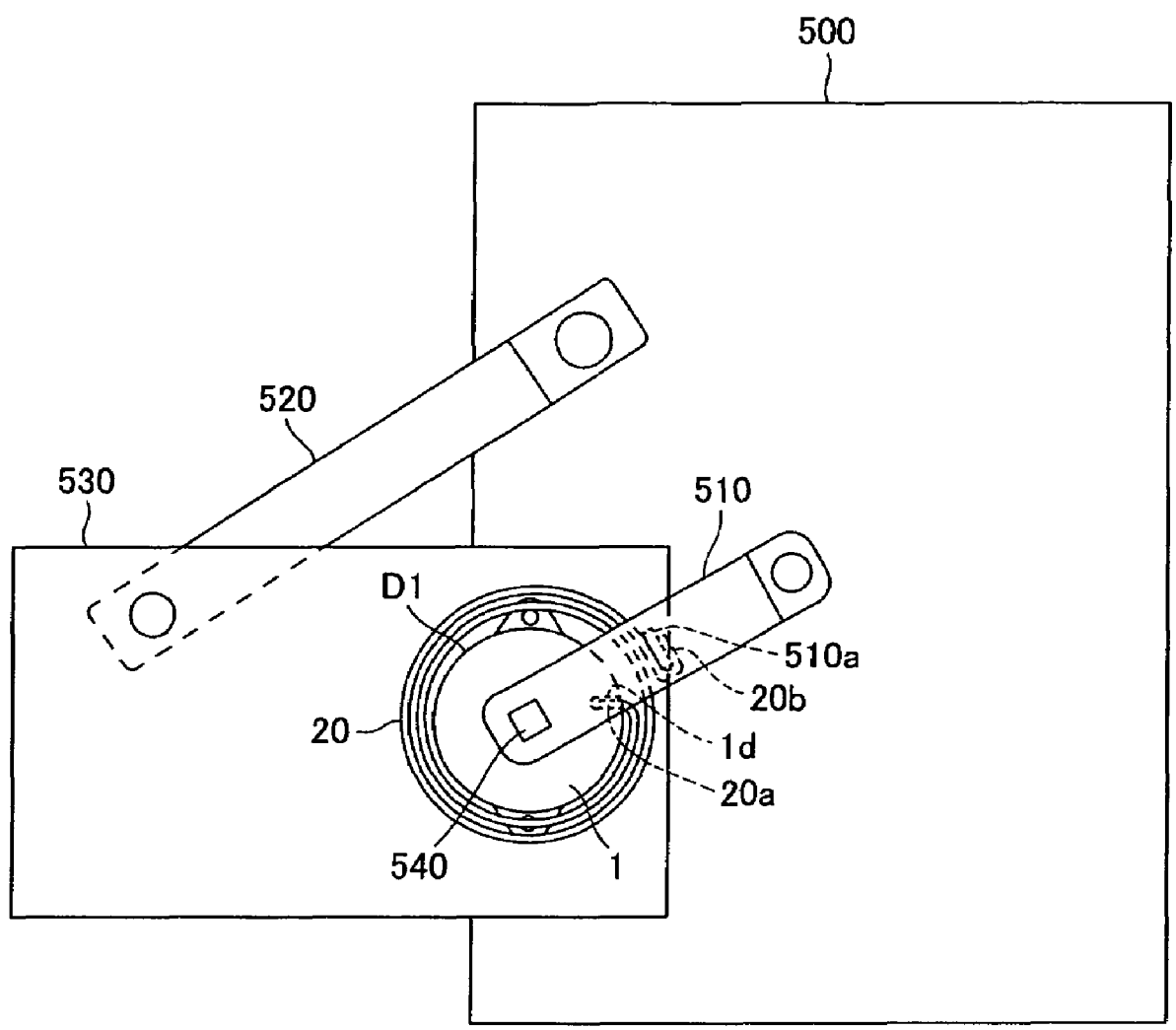
FIG. 45 is a diagram for explaining en effect of the rotational motion assistant mechanism of the embodiment of the invention.

FIGS. 43 and 45 show a hoisting and lowering case having the rotational motion assistant mechanism according to an embodiment of the present invention. As shown in these drawings, the hoisting and lowering case 500 is connected to a fixed plate 530 through a movable arm 510 and an auxiliary arm 520. If a user grasps a handle (not shown) and pulls it downward, the hoisting and lowering case 500 rotates from its accommodating position to its using position, and if the user pushes the hoisting and lowering case 500 upward, the hoisting and lowering case 500 is rotated from the using position to the accommodating position.

The rotational motion assistant mechanism of this embodiment includes a spring member 20, and includes the rotary damper D1 of the embodiment 1.

The spring member 20 biases a subject to be controlled in one direction. In this embodiment, the spring member 20 biases the hoisting and lowering case 500 which is the subject to be controlled upward. It is possible to employ an extension coil spring as the spring member 20, but in this embodiment, a spiral-spring is employed. This is because that the spiral-spring has a merit that a small installation space suffices as compared with the extension coil spring.

One end 20a of the spring member 20 which becomes a fulcrum is supported by a stationary portion, and the other end 20b which becomes an acting point is supported by a movable portion. The spring member 20 is disposed such that as the spring member 20 is wound as the spring member 20 is rotated when the hoisting and lowering case 500 is lowered, energy for biasing the hoisting and lowering case 500 upward is accumulated.

In this embodiment, as the stationary portion which supports the one end 20a of the spring member 20, the groove 1d (see FIGS. 1 and 44) formed in the casing 1 of the rotary damper D1 fixed to the fixed plate 530 is utilized. That is, the one end 20a of the spring member 20 is engaged and supported in the groove 1d. By providing the groove 1d for supporting the one end 20a of the spring member 20 in the casing 1 of the rotary damper D1, there is a merit that it is unnecessary to separately form a supporting portion for supporting the one end 20a of the spring member 20 on the fixed plate 530 or the like. As a movable portion for fixing the other end 20b of the spring member 20, a retaining portion 510a formed on the movable arm 510 is utilized.

Figure 44:
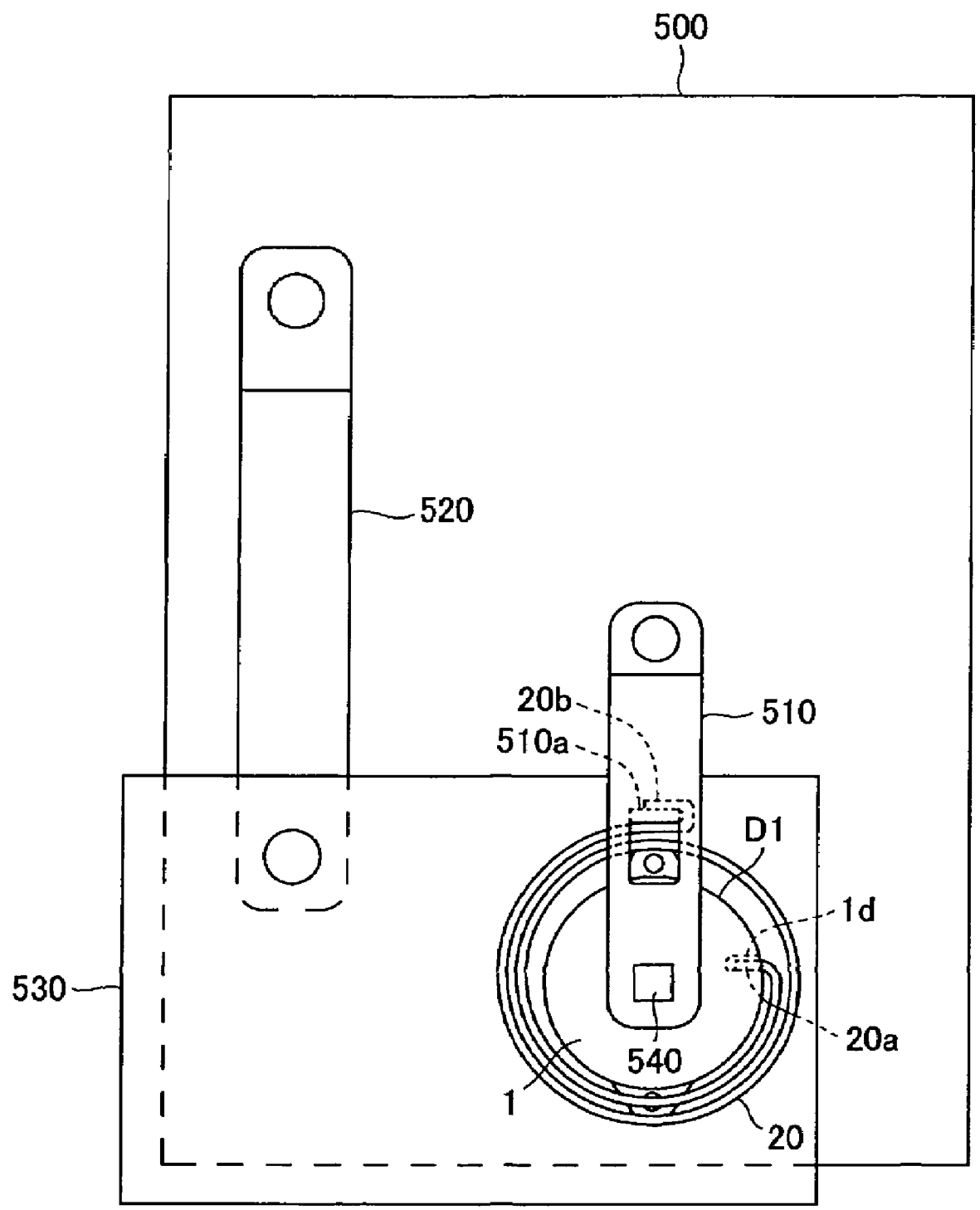
FIG. 44 is a left side view showing the hoisting and lowering case having the rotational motion assistant mechanism of the embodiment of the invention.

A location of the rotary damper D1 is not limited, but in this embodiment, as shown in FIG. 44, the rotary damper D1 is fixed to the fixed plate 530 such that the casing 1 is located in a space formed at a substantially center of the spring member 20 comprising the spiral-spring. With this structure, since the entire rotational motion assistant mechanism including the spring member 20 and the rotary damper D1 can be reduced in size, there is a merit that the installation space of the rotational motion assistant mechanism can be reduced. It is of course possible to independently dispose the spring member 20 and the rotary damper D1.

The rotational motion assistant mechanism having the above-described structure functions as follows. That is, as shown in FIG. 45, if the hoisting and lowering case 500 is lowered from the accommodating position to the using position, the movable arm 510 turns in the same direction ("lowering direction", hereinafter) as the rotation direction of the hoisting and lowering case 500. Since the other end 20b of the spring member 20 is supported by the movable arm 510, if the movable arm 510 turns in the lowering direction, the spring member 20 is wound up. Thus, the stress of the spring member 20 is increased as the hoisting and lowering case 500 is lowered. The stress of the spring member 20 functions as a force for supporting the lowering hoisting and lowering case 500 and thus, the rotational motion of the hoisting and lowering case 500 is moderated, and safety of the operation can be secured.

On the other hand, if the movable arm 510 turns as the hoisting and lowering case 500 is lowered, the rotor 7 connected to a support shaft 540 which rotates together with the movable arm 510 rotates in the counterclockwise direction in FIG. 1 in the casing 1. When the rotor 7 rotates in the counterclockwise direction in this manner, a resistance of the viscous fluid generated by the rock of the vane 3 becomes extremely small, and the braking force exhibited by the rotary damper D1 becomes also small. Therefore, when the hoisting and lowering case 500 is lowered, the hoisting and lowering case 500 rotates without being affected by the damping effect of the rotary damper D1.

On the other hand, when the hoisting and lowering case 500 is hoisted toward the accommodating position from the using position, the stress of the spring member 20 functions as a force for hoisting the hoisting and lowering case 500 and thus, a user can lift the hoisting and lowering case 500 with a small force.

Since the one end 20a of the spring member 20 is supported by the stationary portion, the spring member 20 can exhibit only stress within a given range. Thus, if only the spring member 20 is used, it is difficult to sufficiently assist the rotational motion of the hoisting and lowering case 500. That is, since the hoisting and lowering case 500 includes a shelf 550 as shown in FIG. 43 and can accommodate an article, the weight of the entire hoisting and lowering case 500 is varied between a case in which the article is accommodated in the hoisting and lowering case 500 and a case in which no article is accommodated in the hoisting and lowering case 500 or a case in which the entire weight of the articles is heavy, and the rotational moment of the hoisting and lowering case 500 is varied. Therefore, if there is provided only the spring member 20 which can exhibit only the stress in the given range, when the hoisting and lowering case 500 whose entire weight is light is lifted up from the using position to the accommodating position, the rotation speed of the hoisting and lowering case 500 is largely accelerated by the operating force of a user and the stress of the spring member 20, and there is an adverse possibility that the hoisting and lowering case 500 is abruptly rotated and stops at the accommodating position, and a large impact is generated when the hoisting and lowering case 500 stops.

On the other hand, if the biasing force of the spring member 20 applied to the hoisting and lowering case 500 is set small so as to reduce the impact caused when the hoisting and lowering case 500 stops, a burden of a user when the hoisting and lowering case 500 whose entire weight is heavy is lifted up from the using position to the accommodating position becomes large.

However, since the rotational motion assistant mechanism of this embodiment has the rotary damper D1, it is possible to overcome the inconvenience without requiring a user to do any special operation.

That is, according to the rotary damper D1, it is possible to automatically adjust the magnitude of the exhibited braking force in accordance with variation in load such that when the load is small, the exhibited braking force becomes small, and when the load is great, the exhibited braking force becomes great. Therefore, even when the rotational moment of the hoisting and lowering case 500 is varied, it is possible to adjust the biasing force of the spring member 20 applied to the hoisting and lowering case 500 without doing any operation. Thus, according to the rotational motion assistant mechanism of the embodiment, it is possible to always reduce an impact caused when the hoisting and lowering case 500 stops at the accommodating position irrespective of variation of rotational moment of the hoisting and lowering case 500.

Further, according to the rotational motion assistant mechanism of this embodiment, since it is possible to always reduce the impact when the hoisting and lowering case 500 stops at the accommodating position, the biasing force of the spring member 20 applied to the hoisting and lowering case 500 can be set large within a range which does not hinder the using condition. Thus, even when the hoisting and lowering case 500 whose entire weight is heavy is lifted up to the accommodating position from the using position, it is possible to reduce the burden of the user.

If a predetermined or higher load is applied to the rotary damper D1, the rotary damper D1 exhibits greater braking force. Thus, the biasing force of the spring member 20 applied to the hoisting and lowering case 500 (force for lifting the hoisting and lowering case 500 by the spring member 20) can be reduced to substantially zero by the braking force, and the rotational motion of the hoisting and lowering case 500 can be stopped. The rotational motion assistant mechanism of the present invention can also be applied to various subjects in addition to the above-described hoisting and lowering case.

INDUSTRIAL APPLICABILITY

As explained above, according to the present invention, it is possible to provide a rotary damper which can automatically adjust an exhibited braking force in accordance with variation in load caused by variation of rotational moment of a subject to be controlled, and which can reduce the variation in rotation speed of a subject to be controlled to an extremely small value.

Further, according to the present invention, it is possible to provide an auto part such as a glove box, a console box, a reclining seat, an arm rest and the like in which variation in rotation speed is small even if the rotational moment is varied.

Further, according to the present invention, it is possible to provide a rotational motion assistant mechanism capable of automatically adjusting a biasing force of a spring member applied to a subject to be controlled in correspondence with variation of rotational moment of the subject to be controlled.

The invention claimed is:

1. A rotary damper comprising a fluid chamber which is formed in a casing and into which viscous fluid is charged, a vane which is disposed in said fluid chamber, a fluid passage formed in said vane or in a partition wall which partitions said fluid chamber, and a valve which automatically varies a flow rate of the viscous fluid passing through said fluid passage in correspondence with variation in load, said valve comprises a leaf spring including a to-be supported portion and a flow rate-adjusting portion, said to-be supported portion is supported by said vane or said partition wall, wherein said flow rate-adjusting portion is provided so as not to close the fluid passage when no load is applied, wherein said flow rate-adjusting portion bends so that its one surface side projects when no load is applied, wherein said flow rate-adjusting portion becomes deformed in a direction in which said fluid passage is closed when receiving pressure of the viscous fluid on its one surface side, wherein a flow rate of the viscous fluid passing through said fluid passage is adjusted depending on a degree of deformation of said flow rate-adjusting portion corresponding to magnitude of pressure of the viscous fluid applied to one surface side of said flow rate-adjusting portion, and wherein said flow rate-adjusting portion keeps said fluid passage open at all times while pressure of the viscous fluid is received on its other surface side.

2. The rotary damper according to claim 1, wherein said casing includes a groove formed on its outer peripheral surface, which is capable of supporting one end of a spring member which biases the rotation of a subject to be controlled in one direction.

3. An auto part having a rotary damper according to claim 1.

4. A rotational motion assistant mechanism comprising a spring member which biases rotation of a subject to be controlled in one direction, and a rotary damper to delay the rotation of said subject to be controlled against stress of said spring member, wherein said rotary damper is the rotary damper of claim 1.

* * * * *